(12) United States Patent
Park et al.

(10) Patent No.: US 11,627,349 B2
(45) Date of Patent: Apr. 11, 2023

(54) ELECTRONIC DEVICE AND CONTROL METHOD THEREOF

(71) Applicant: SAMSUNG ELECTRONICS CO., LTD., Suwon-si (KR)

(72) Inventors: Sunho Park, Suwon-si (KR); Minho Kim, Suwon-si (KR); Doochan Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 17/037,903

(22) Filed: Sep. 30, 2020

(65) Prior Publication Data

US 2021/0127148 A1    Apr. 29, 2021

(30) Foreign Application Priority Data

Oct. 29, 2019    (KR) .................. 10-2019-0135166

(51) Int. Cl.
| | | |
|---|---|---|
| *H04N 21/236* | (2011.01) | |
| *H04N 21/6437* | (2011.01) | |
| *H04L 47/36* | (2022.01) | |
| *H04N 21/442* | (2011.01) | |
| *H04N 21/647* | (2011.01) | |

(Continued)

(52) U.S. Cl.
CPC ..... *H04N 21/23605* (2013.01); *H04L 47/365* (2013.01); *H04L 65/1101* (2022.05); *H04L 65/70* (2022.05); *H04N 21/44209* (2013.01); *H04N 21/4621* (2013.01); *H04N 21/6373* (2013.01); *H04N 21/6437* (2013.01); *H04N 21/64776* (2013.01); *H04N 21/6583* (2013.01)

(58) Field of Classification Search
CPC ....... H04N 21/23605; H04N 21/44209; H04N 21/4621; H04N 21/6373; H04N 21/6437; H04N 21/64776; H04N 21/6583; H04N 19/58; H04N 21/6405; H04L 29/06183; H04L 47/365; H04L 65/607; H04L 47/26; H04L 29/06027

See application file for complete search history.

(56) References Cited

U.S. PATENT DOCUMENTS 10,681,382 B1 *    6/2020    Brailovskiy ........... H04N 19/58
2003/0083870 A1 *    5/2003    Lee .................. H04L 29/06027
                                                            704/229

(Continued)

FOREIGN PATENT DOCUMENTS

| KR | 10-2007-0048014 | 5/2007 |
| KR | 10-2010-0086178 | 7/2010 |

(Continued)

OTHER PUBLICATIONS

International Search Report and Written Opinion dated Jan. 26, 2021 in corresponding International Application No. PCT/KR2020/013294.

*Primary Examiner* — Vinncelas Louis
(74) *Attorney, Agent, or Firm* — Nixon & Vanderhye P.C.

(57) ABSTRACT

Disclosed is an electronic device that receives a packet of a content image including a plurality of frames from an external device, transmits a signal indicating whether a packet is received, including a request for a bit rate of an image in a transmitted signal, receives a packet with a changed bit rate of the image based on the request, and displays the image on the display based on the received packet.

14 Claims, 15 Drawing Sheets

(51) Int. Cl.
*H04N 21/6583* (2011.01)
*H04N 21/462* (2011.01)
*H04N 21/6373* (2011.01)
*H04L 65/70* (2022.01)
*H04L 65/1101* (2022.01)

(56) References Cited

U.S. PATENT DOCUMENTS

| | | |
|---|---|---|
| 2006/0026294 A1 | 2/2006 | Virdi et al. |
| 2010/0046634 A1* | 2/2010 | Dai .................... H04N 21/6405 375/240.27 |
| 2014/0254365 A1* | 9/2014 | Yanagisawa ............ H04L 47/26 370/232 |
| 2017/0251274 A1* | 8/2017 | Fujii .................. H04N 21/6373 |
| 2019/0089761 A1 | 3/2019 | Lee |

FOREIGN PATENT DOCUMENTS

| | | | |
|---|---|---|---|
| KR | 10-1915885 | 11/2018 | |
| WO | WO-2010085043 A2 * | 7/2010 | ......... H04N 21/2401 |

\* cited by examiner

FIG. 8
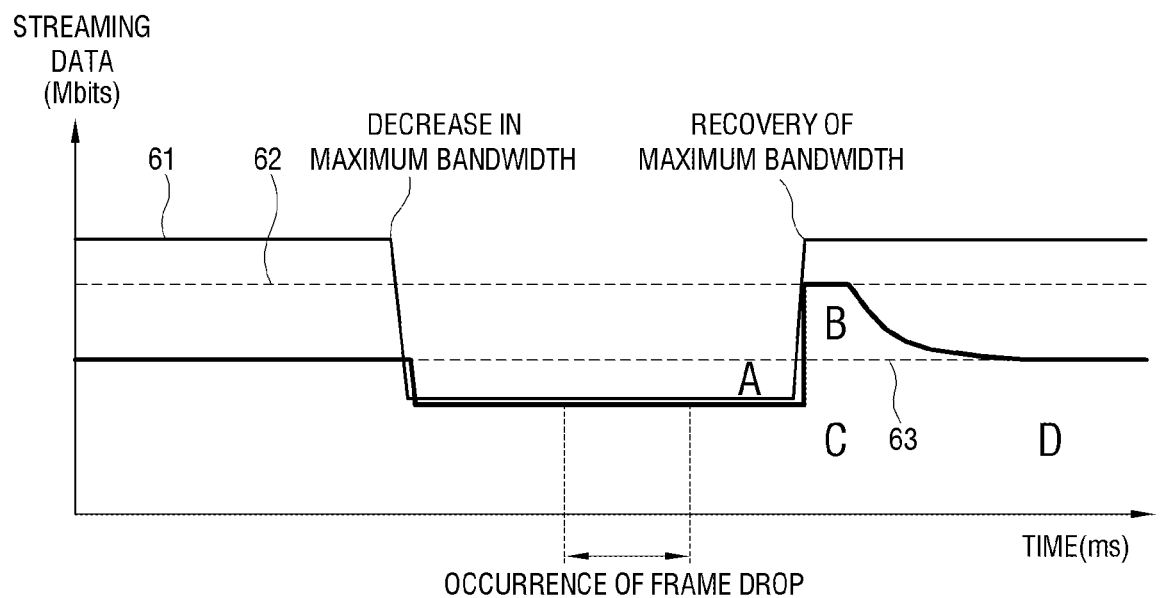
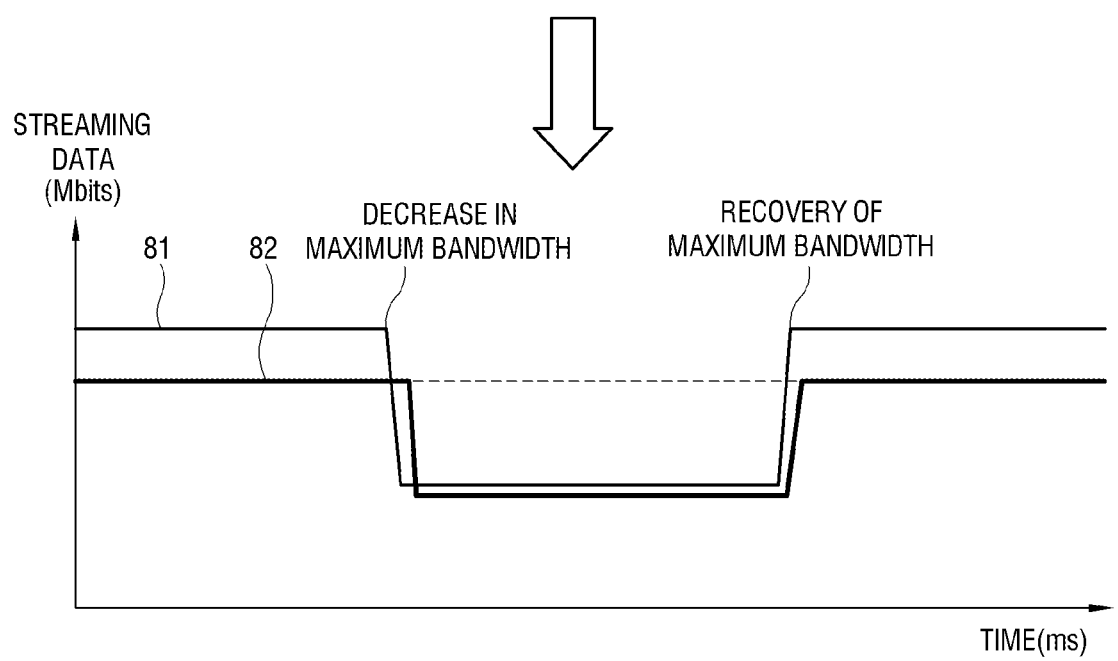

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2019-0135166, filed on Oct. 29, 2019, in the Korean Intellectual Property Office, the disclosure of which is incorporated by reference herein in its entirety.

BACKGROUND

1. Field

The disclosure relates to an electronic device and a control method thereof, and for example, to an electronic device displaying content streamed and received from an external device, and a control method thereof.

2. Description of Related Art

In recent years, with the rapid development of information and communication technology, streaming services for enjoying content in real time are becoming popular. The streaming service may refer to a communication service that receives content in real time from an external device such as a content provider through a network and displays the content. The streaming service guarantees real-time performance to provide a viewing environment that delivers realism and liveliness as if a user is in the field.

SUMMARY

Embodiments of the disclosure provide an electronic device capable of providing a high-definition image by maximizing and/or increasing a use of bandwidth, providing improved realism and liveliness through a streaming service by minimizing and/or reducing a delay time of the streaming service by improving responsiveness to communication disconnection, bandwidth fluctuation, and the like, and providing an improved viewing environment for the streaming service, and a control method thereof.

According to an example embodiment, an electronic device is provided, the electronic device including: a communication interface comprising communication circuitry; a display; and a processor configured to: control the communication interface to receive a packet of a content image comprising a plurality of frames from an external device, control the communication interface to transmit a signal indicating whether the packet is received to the external device, control the communication interface to include a request for a bit rate of an image in the transmitted signal, and control a packet in which the bit rate of the image is changed to be received based on the request and the image to be displayed on the display based on the received packet.

The processor may receive information on a plurality of bit rates of the image provided from the external device through the communication interface, select the bit rate of the image to be requested among the plurality of bit rates, and control the communication interface to include the request for the selected bit rate in the transmitted signal.

The processor may identify a bandwidth in which the packet is received, and determine the bit rate of the image to be requested based on the identified bandwidth.

The processor may identify whether the packet is received based on an order of the plurality of frames.

The processor may control the communication interface to include a request for retransmission of a first packet identified as not being received in the transmitted signal.

The processor may receive the first packet in which the bit rate of the image is reduced and a second packet currently streamed in the same section through the communication interface, and control the image to be displayed on the display based on the received first packet and second packet.

The processor may receive a third packet in which the bit rate of the image increases through the communication interface after the second packet is received, and display the image on the display based on the received third packet.

The content may include a plurality of frame groups each including a plurality of subframes, and the processor may identify a first frame group and a second frame group corresponding to the same content section as the first frame group, and decode the plurality of subframes included in the identified second frame group.

The processor may identify the second frame group based on information indicating the first frame group and the second frame group.

The information may include information indicating a size of a frame group subsequent to the second frame group.

According to another example embodiment, a method of controlling an electronic device is provided, the method including: receiving a packet of a content image comprising a plurality of frames from an external device; transmitting a signal indicating whether the packet is received to the external device; requesting a bit rate of an image to be included in the transmitted signal; and receiving a packet in which the bit rate of the image is changed based on the request and displaying the image on the display based on the received packet.

The requesting the bit rate to be included in the transmitted signal may include: receiving information on a plurality of bit rates of an image provided from the external device; selecting the bit rate of the image to be requested among the plurality of bit rates, and requesting the selected bit rate to be included in the transmitted signal.

The requesting the bit rate to be included in the transmitted signal may include: identifying a bandwidth in which the packet is received; and determining the bit rate of the image to be requested based on the identified bandwidth.

The method may further include: identifying whether the packet is received based on an order of the plurality of frames.

The requesting the bit rate to be included in the transmitted signal may include requesting retransmission of a first packet identified as not being received to be included in the transmitted signal.

The method may further include: receiving the first packet with a reduced bit rate of the image and a second packet currently streamed in the same section, in which the displaying of the image may include displaying an image based on the received first packet and second packet.

The content may include a plurality of frame groups each including a plurality of subframes, and the displaying of the image may include: identifying a first frame group and a second frame group corresponding to the same content section as the first frame group; and decoding the plurality of subframes included in the identified second frame group.

The identifying of the second frame group may include identifying the second frame group based on information indicating the first frame group and the second frame group.

According to an example embodiment, a system is provided, the system including: a first electronic device configured to transmit a packet of a content image comprising a plurality of frames; and a second electronic device configured to display an image based on a packet transmitted from the first electronic device and to transmit a signal including a request for whether the packet is received and a bit rate of the image to the first electronic device, wherein the first electronic device may transmit a packet with a changed bit rate of the image based on a request transmitted from the second electronic device.

The first electronic device may transmit the first packet with a reduced bit rate of the image and a second packet currently streamed in the same section according to a request for retransmission of the non-received first packet from the first electronic device.

Embodiments of the disclosure may provide an electronic device capable of providing a high-definition image by maximizing and/or increasing a use of bandwidth, providing improved realism and liveliness through a streaming service by minimizing and/or reducing a delay time of the streaming service by improving responsiveness to communication disconnection, bandwidth fluctuation, and the like, and providing an improved viewing environment for the streaming service, and a control method thereof.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 8 is a graph illustrating an example of changing a bit rate according to an embodiment;

DETAILED DESCRIPTION

Figure 1:
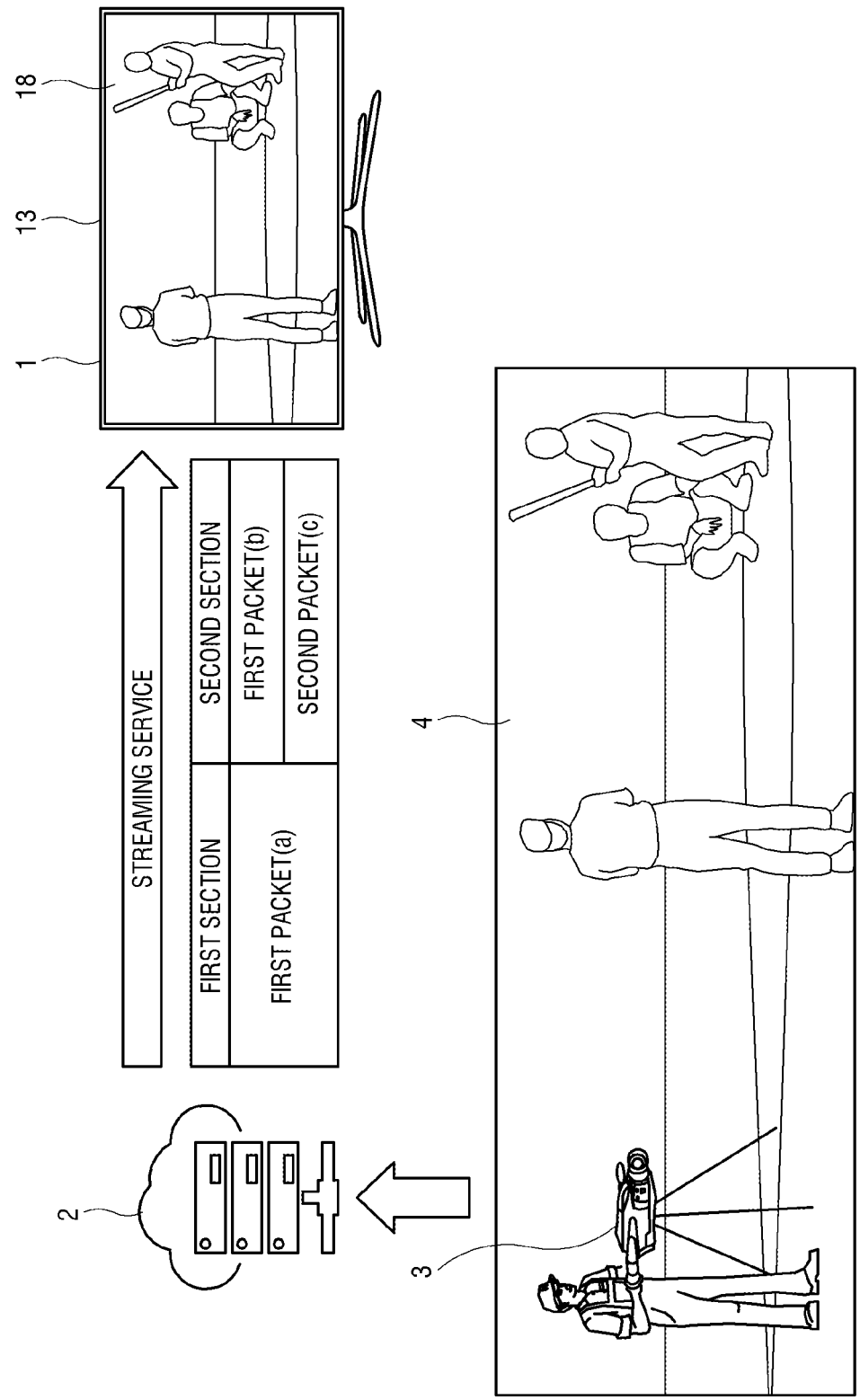
FIG. 1 is a diagram illustrating an example electronic device according to an embodiment.

Hereinafter, various example embodiments will be described in greater detail with reference to the accompanying drawings. The description of embodiments below references the accompanying drawings, and the same reference numerals or symbols illustrated in each drawing indicate components that perform substantially the same operation. In the disclosure, at least one of a plurality of elements refers to not only all of the plurality of components, but also each one or all combinations thereof excluding the rest of the plurality of components.

FIG. 1 is a diagram illustrating an example electronic device according to an embodiment. As illustrated in FIG. 1, an electronic device 1 may be implemented as a display device that may include a display 13 to display an image 18. As an example, the electronic device 1 may include a TV, a computer, a tablet, a portable media player, a wearable device, a video wall, an electronic frame, and the like.

In addition, the electronic device 1 may be implemented as various types of devices, such as an image processing device including, for example, and without limitation, a set-top box without a display, household appliances such as a refrigerator and a washing machine, an information processing device such as a computer body, or the like. In this case, the electronic device 1 may be connected to an external TV to transmit an image signal to the external TV, so the external TV may display the image. For convenience of explanation, the disclosure will be described under the assumption that the electronic device 1 is implemented as a TV. However, it will be understood that the disclosure is not limited thereto.

The electronic device 1 may provide a streaming service through streaming communication with the external device 2. The streaming service may refer, for example, to a communication service in which the external device 2 provides content to the electronic device 1 in real time to display a content image 18. The content may include various types of content such as sports, games, concerts, etc., but is not limited thereto.

The external device 2 may include a content provider capable of providing various content, including, for example, and without limitation, a contents delivery network (CDN), at least one server, and the like. However, the external device 2 is not limited thereto, and therefore the external device 2 may be implemented as a device or server for remote connection or screen sharing according to a design method. For example, the external device 2 may control the electronic device 1 to display the content image 18 transmitted by streaming By remotely controlling the external device 2 by the electronic device 1, the content may be streamed and transmitted. In addition, the external device 2 and the electronic device 1 may be implemented to perform a so-called mirroring function to display the same content image 18.

For example, when the electronic device 1 provides a streaming service for a sports game, for example, a baseball game, the external device 2 may acquire video or audio for a baseball game field 4 currently in progress with an image acquisition device 3 such as a camera and transmit data of the acquired video or audio to the electronic device 1. The electronic device 1 may display the image 18 of the baseball game field 4 based on the data of the video or audio received from the external device 2. In this way, the electronic device 1 may provide the streaming service for the baseball game field 4, allowing a user watching the image 18 of the baseball game field 4 to feel realism and liveliness as if the user is at the baseball game field 4.

According to an embodiment, it is possible to minimize and/or reduce the real-time performance of the streaming service, for example, the delay time of the image display. The delay of the image display may occur, for example, when the electronic device 1 fails to receive some packets due to communication disconnection or the like. The electronic device 1 may receive packets from the external device 2 and sort the packets according to the order of the frames. The electronic device 1 may identify packets that are not received among the sorted packets, and may request retransmission of the packets identified as being not received to the external device 2. In this case, the external device 2 may transmit packets that the electronic device 1 does not receive when transmitting packets currently streamed, and the electronic device 1 may receive the non-received packets when receiving the packet currently being streamed.

In this way, the electronic device 1 may receive the non-received packets simultaneously with receiving a packet currently being streamed, and thus display frames without delay before all pre-cached packets are consumed.

According to an embodiment, it is possible to provide a high-definition image 18 while minimizing and/or reducing the delay time of the image display in the streaming service. For example, the external device 2 may encode the frame at a bit rate using an available bandwidth and transmit the encoded frame to the electronic device 1, and the electronic device 1 may decode the frame at the bit rate using the available bandwidth and display the decoded frame. For example, the electronic device 1 may display the frame decoded at the bit rate using the available bandwidth, thereby providing a more improved image quality, that is, a higher-definition streaming service than when the available bandwidth is not utilized.

In a situation where the electronic device 1 provides the high-definition streaming service using the available bandwidth, it may not be able to receive some frames due to the communication disconnection and the like. In this case, as described above, the electronic device 1 may receive the non-received packet simultaneously with receiving other packets. With reference to FIG. 1, the external device 2 may transmit a packet encoded at a first bit rate using an available bandwidth to the electronic device 1, and the electronic device 1 may not receive a first packet (a) of the first bit rate due to the communication disconnection and the like. In this case, since the available bandwidth is mostly used for the high-definition streaming service, the external device 2 may transmit a first packet (b) to be retransmitted encoded at a second bit rate lower than the first bit rate and a second packet (c) to be currently streamed together, and the electronic device 1 may receive the first packet (b) retransmitted along with a second packet (c) and decode the received first packet (b) and second packet (c) at the second bit rate lower than the first bit rate.

For example, the electronic device 1 may decode the first packet (b) and the second packet (c) at the second bit rate lower than the first bit rate using the available bandwidth, and as a result, receive packets and display the packets without delay before all the pre-cached frames are consumed despite the bandwidth limitation in the high-definition streaming service. When the transmission of the non-received packet is completed, the high-definition streaming service is continued by changing to the first bit rate using the bandwidth again.

In this way, in the case of retransmitting the non-received packet in a situation where the high-definition streaming service is provided by using the available bandwidth, the bit rate is temporarily reduced to retransmit the non-received packets along with the packets currently streamed in consideration of the bandwidth that may be insufficient, thereby more effectively transmitting the non-received packets without the delay of the streaming Therefore, according to an embodiment, it is possible to actively cope with the communication disconnection or the like by temporarily adjusting the bit rate when some packets are not received due to the communication disconnection, and the like while providing the high-definition streaming service by maximizing and/or increasing the bandwidth utilization.

Figure 2:
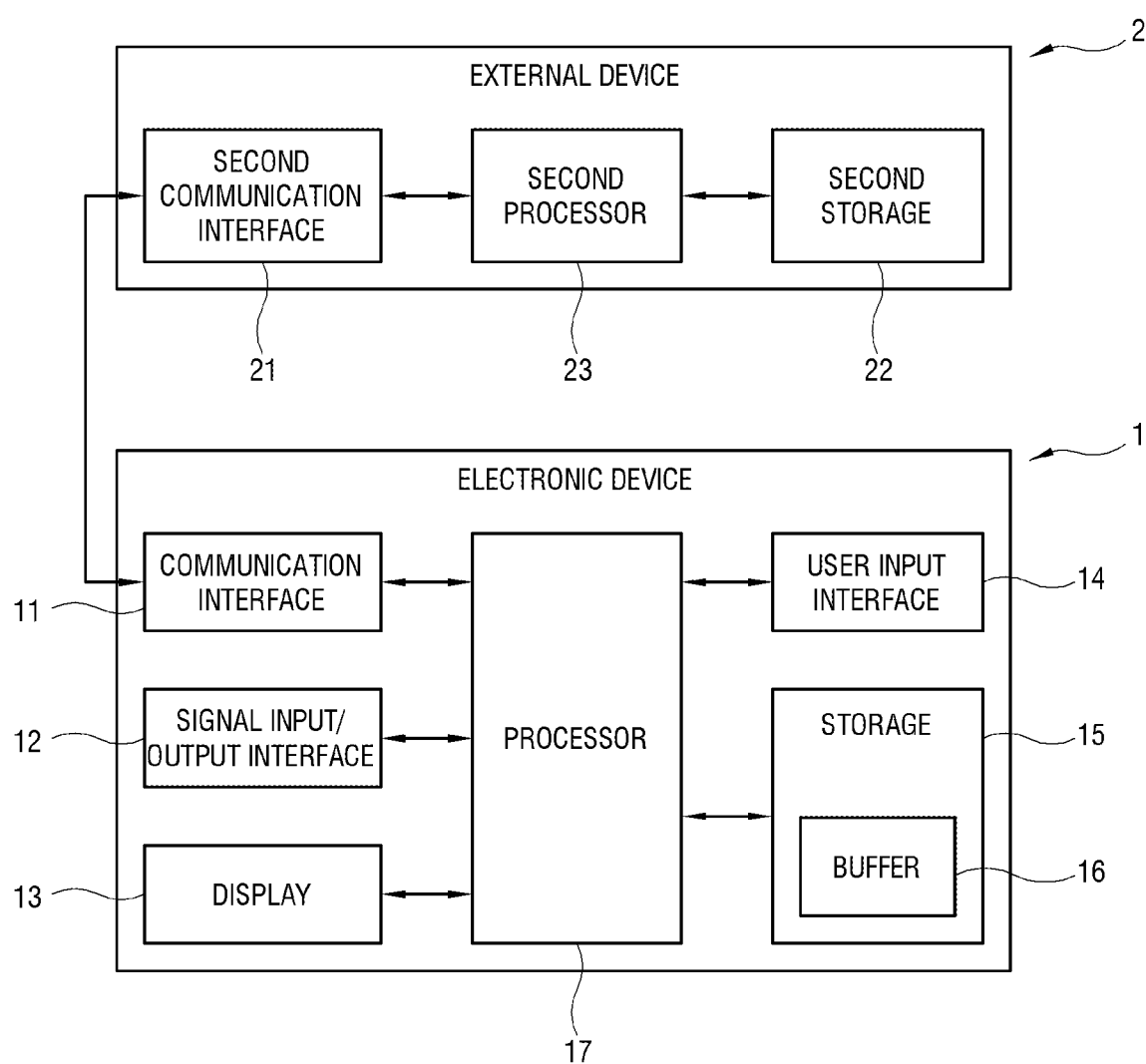
FIG. 2 is a block diagram illustrating an example configuration of the electronic device of FIG. 1 according to an embodiment.

FIG. 2 is a block diagram illustrating an example configuration of the electronic device of FIG. 1 according to an embodiment. As illustrated in FIG. 2, the electronic device 1 may include a communication interface (e.g., including communication circuitry) 11, a signal input/output interface (e.g., including input/output circuitry) 12, a display 13, a user input interface (e.g., including input circuitry) 14, a storage 15, and a processor (e.g., including processing circuitry) 17.

Hereinafter, an example configuration of the electronic device 1 will be described. Although the embodiment describes the case where the electronic device 1 is a TV, the electronic device 1 may be implemented as various types of devices, and therefore the embodiment does not limit the configuration of the electronic device 1. The electronic device 1 may not be implemented as a TV. In this case, the electronic device 1 may not include components for displaying an image, such as the display 13. For example, when the electronic device 1 is implemented as a set-top box, the electronic device 1 may output an image signal to an external TV through the signal input/output interface 12.

The communication interface 11 may include, for example, a two-way communication circuit that may include at least one of components such as communication modules and communication chips corresponding to various types of wired and wireless communication protocols. For example, the communication interface 11 may be implemented as a wireless communication module that performs wireless communication with an access point (AP) according to a Wi-Fi system, a wireless communication module that performs one-to-one direct wireless communication such as Bluetooth, or a LAN card that is connected to a router or a gateway in a wired manner.

The communication interface 11 may communicate with the external device 2 on the network according to a predetermined communication protocol. For example, it is possible to transmit/receive a data packet to and from the external device 2 based on a transmission control protocol/Internet protocol (TCP/IP), a user datagram protocol (UDP), a real-time transport protocol/RTP control protocol (RTP/RTCP), a hyper-text transfer protocol (HTTP), a secure reliable transport (SRT), and the like. Here, the SRT protocol is a type of communication protocol modified from a UDP based data transfer (UDT) protocol, which is a data transmission method based on the UDP protocol.

The communication interface 11 may receive a control signal transmitted from a remote controller by communicating with the remote controller separated from the main body of the electronic device 1.

The signal input/output interface 12 may include various input/output circuitry and may be wired with a peripheral device such as a set-top box or an optical media player in a 1:1 or 1:N (N is a natural number) manner to receive data from the peripheral devices or output data to the peripheral device. For example, the signal input/output interface 12 may receive broadcast signals such as terrestrial waves, cables, and satellite waves from a set-top box, and may further include a tuning unit for tuning the broadcast signals if necessary. The signal input/output interface 12 may include a connector, a port, or the like according to a predetermined transmission standard, such as an HDMI port, a DisplayPort, a DVI port, a thunderbolt, and a USB port.

The display 13 may include a display panel that may display an image on a screen. The display panel may be provided as a light-receiving structure such as, for example, and without limitation, a liquid crystal type, a self-luminous structure such as an OLED type, or the like. The display 13 may further include additional components according to the structure of the display panel. For example, if the display panel is a liquid crystal type, the display 13 may include a liquid crystal display panel, a backlight unit that supplies light, and a panel driving substrate that drives a liquid crystal of the liquid crystal display panel. However, the display 13 may be omitted when the electronic device 1 is implemented as a set-top box and the like.

The user input interface 14 includes various input circuitry including types of input interface related circuits that are provided to be manipulated by a user in order to perform user input. The user input interface 14 may be configured in various forms according to the type of the electronic device 1, and may include, for example, a mechanical or electronic button unit of the electronic device 1, a touch pad, a touch screen installed on the display 13, and the like.

The storage 15 stores digitized data. The storage 15 may include a nonvolatile storage that may preserve data regardless of whether the nonvolatile storage is supplied with power, and a volatile memory that may be loaded with data processed by the processor 17 and may not preserve data when the volatile memory is not supplied with power.

The storage may include a flash-memory, a hard-disc drive (HDD), a solid-state drive (SSD), a read only memory (ROM), and the like, and the memory may include a buffer 16, a random access memory (RAM), and the like. The buffer 16 may temporarily store data packets received from the external device 2 in order to buffer a difference in transmission speed or processing speed between the communication interface 11 and the processor 17.

The processor 17 may include various processing circuitry including, for example, one or more hardware processors implemented as a CPU, a chipset, a buffer, a circuit, and the like that are mounted on a printed circuit board, and may be implemented as a system on chip (SOC) depending on the design method. The processor 17 may include modules corresponding to various processes such as a demultiplexer, a decoder, a scaler, an audio digital signal processor (DSP), and an amplifier when the electronic device 1 is implemented as a display device. Here, some or all of these modules may be implemented as SOC. For example, a module related to image processing such as a demultiplexer, a decoder, and a scaler may be implemented as an image processing SOC, and an audio DSP may be implemented as a separate chipset from the SOC.

The processor 17 may control the display 13 to receive a packet of a content image including a plurality of frames from the external device 2 through the communication interface 11, decode the received packet at the first bit rate, and display the content image 18.

In addition, when the processor 17 identifies that the first packet (a) is not received based on the order of the frames before displaying the content image 18, the processor 17 may request the external device 2 to retransmit the first packet (a).

In addition, the processor 17 may receive the first packet (b) together in a section in which the second packet (c) is received from the external device 2 through the communication interface 11, and decode the received first packet (b) and second packet (c) at the second bit rate lower than the first bit rate and display the decoded received first packet (b) and second packet (c) on the display 11 as the image 18. A more specific operation of the processor 17 will be described in detail below.

The processor 17 may include control programs (or instructions) to control the overall components of the electronic device 1, a nonvolatile memory in which control programs are installed, a volatile memory in which at least a part of the installed control programs is loaded, and at least one processor or a central processing unit (CPU) in which the loaded control programs are executed. In addition, such a control program may also be stored in other electronic devices other than the electronic device 1.

The control program may include a program(s) implemented in the form of at least one of a BIOS, a device driver, an operating system, firmware, a platform, and an application program (application). As an embodiment, the application program may be pre-installed or pre-stored at the time of manufacturing of the electronic device 1, or may be installed based on data of the application program received from the outside when used later. Data of the application program may be downloaded from a server such as an application market. Such a server is an example of a computer program product, but is not limited thereto.

Hereinafter, the configuration of the server 2 will be described. The external device 2 may include a second communication interface (e.g., including communication circuitry) 21, a second storage 22, and a second processor (e.g., including processing circuitry) 23.

The second communication interface 21 may include various communication circuitry and communicate with the electronic device 1 through a network such as the Internet. The second communication interface 21 may transmit and receive data packet to and from the electronic device 1 based on communication protocols corresponding to the communication interface 11 of the electronic device 1, such as TCP/IP, UDP, RTP/RTCP, HTTP, and SRT. The second communication interface 21 may include at least one of components such as communication modules and communication chips corresponding to various types of wired and wireless communication protocols.

The second storage 22 may perform operations such as reading, writing, modifying, deleting, and updating data by the second processor 23. The second storage 22 includes various nonvolatile memories and volatile memories such as a flash memory, a HDD, an SSD, a buffer, and a RAM.

The second storage 23 may include one or more hardware processors implemented as a CPU, a chipset, a buffer, a circuit, and the like that are mounted on a printed circuit board, and may be implemented as a system on chip (SOC) depending on the design method.

The second processor 23 may include various processing circuitry and control the second communication interface 21 to stream a packet of a content image encoded at the first bit rate to the electronic device 1 and transmit the packet.

The second processor 23 may control a second communication interface 21 to identify whether a signal requesting retransmission of the first packet (a) is received from the electronic device 1 through the second communication interface 21, and transmit the first packet (b) and the second packet (c) encoded at the second bit rate lower than the first bit rate to the electronic device 1 in the same section. A more specific operation of the second processor 23 will be described in detail below.

In addition, the second processor 23 may include control programs (or instructions) to control the overall components of the external device 2, a nonvolatile memory in which control programs are installed, a volatile memory into which at least a part of the installed control programs is loaded, and at least one processor or a central processing unit (CPU) in which the loaded control programs are executed. In addition, such a control program may also be stored in other electronic devices other than the external device 2. Since the description related to the control program overlaps with that of the processor 17 of the electronic device 1, a detailed description thereof will be omitted.

The processor 17 may perform at least a part of data analysis, processing, and generation of result information for performing operations of identifying whether the first packet (a) has not been received, requesting retransmission of the first packet (a) that is not received, receiving the first packet (b) and the second packet (c) encoded at the second bit rate in the same section, and decoding the received first packet (b) and second packet (c) at the second bit rate lower than the first bit rate, using at least one of machine learning, a neural network, or a deep learning algorithm as a rule-based or artificial intelligence algorithm.

Similarly, the second processor 23 may perform at least a part of data analysis, processing, and generation of result information for performing operations of transmitting a packet of content encoded at the first bit rate to the electronic device 1, identifying whether a signal requesting retransmission of the first packet (a) is received from the electronic device 1, and transmitting the first packet (b) and the second packet (c) encoded at the second bit rate lower than the first bit rate to the electronic device 1 in the same section, using at least one of machine learning, a neural network, or a deep learning algorithm as a rule-based or artificial intelligence algorithm.

For example, the processor 17 or the second processor 23 may perform functions of a learning unit (e.g., including various processing circuitry and/or executable program elements) and a recognition unit (e.g., including various processing circuitry and/or executable program elements) together. The learning unit may perform a function of generating a trained neural network, and the recognition unit may perform a function of recognizing (or reasoning, predicting, estimating, and determining) data using the trained neural network. The learning unit may generate or update the neural network. The learning unit may obtain training data to generate the neural network. For example, the learning unit may obtain the training data from the storage 15 or the second storage 22 or from the outside. The training data may be data used for training the neural network, and the neural network may be trained using the data performing the above-described operation as the training data.

The learning unit may perform a pre-processing operation on the obtained training data before training the neural network using the training data, or may select data to be used for training from among a plurality of training data. For example, the learning unit may process or filter the training data in a predetermined format, or process data in a form suitable for training by adding/removing noise. The learning unit may generate a neural network configured to perform the above-described operation using the pre-processed learning data.

The trained neural network may include a plurality of neural networks (or layers). The nodes of the plurality of neural networks have weights, and the plurality of neural networks may be connected to each other so that an output value of one neural network is used as an input value of another neural network. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

To perform the above-described operation, the recognition unit may obtain target data. The target data may be obtained from the storage 15 or the second storage 22 or from the outside. The target data may be data to be recognized by the neural network. Before applying to the target data to the trained neural network, the recognition unit may perform the pre-processing operation on the obtained target data, or select data to be used for recognition from among a plurality of target data. For example, the recognition unit may process or filter the target data in a predetermined format, or add/remove noise to process data in a form suitable for recognition. The recognition unit may obtain an output value output from the neural network by applying the preprocessed target data to the neural network. The recognition unit may obtain a probability value or a reliability value along with the output value.

Figure 3:
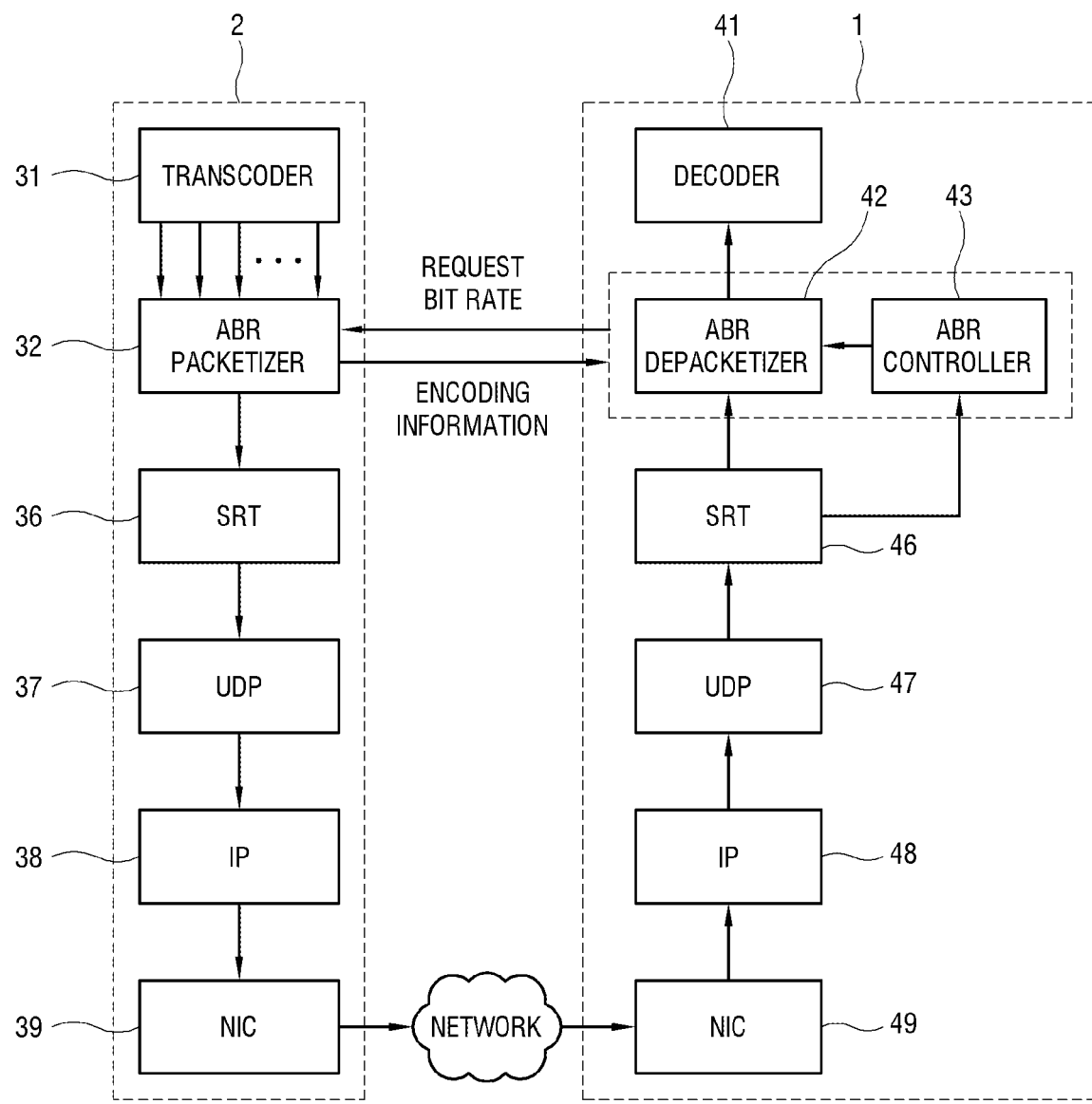
FIG. 3 is a block diagram illustrating an example configuration for transmitting and receiving data of the electronic device of FIG. 1 and an external device according to an embodiment.

FIG. 3 is a block diagram illustrating an example configuration for transmitting and receiving data of the electronic device of FIG. 1 and the external device according to an embodiment. As illustrated in FIG. 3, the external device 2 may include a transcoder 31, an available bit rate (ABR) packetizer (e.g., including packetizing circuitry) 32, an SRT 36, a UDP 37, an IP 38, and a network interface card 39, and the electronic device 1 may include a decoder 41, an ABR depacketizer 42, an ABR controller 43, the SRT 36, a UDP 47, an IP 48, and an NIC 49. However, the configuration of the electronic device 1 and the external device 2 is not limited to FIG. 3, and may further include components not illustrated in FIG. 3 or at least one of the components illustrated in FIG. 3 depending on the design method.

Referring to FIG. 3, first, an operation of the external device 2 for a streaming service will be described. The operation of the external device 2 described below may be achieved by allowing at least one of the second processor 23 and the second communication interface 21 to perform operations of all or a part of the components illustrated in FIG. 3.

The transcoder 31 of the external device 2 may encode a content image for each of the plurality of bit rates. For example, the transcoder 31 may encode the content images for each bit rate corresponding to various image qualities, such as ultra-high definition (UHD), full-HD (FHD), and HD, and may provide the encoded content image at bit rates each corresponding to UHD, FHD, HD, and the like.

The ABR packetizer 32 may packetize the content image encoded at a predetermined bit rate by the transcoder 31. The packetization may refer to a process of dividing the encoded data to correspond to the size of the packet and carrying the divided encoded data in the packet. Describing the packetization of the UHD video as an example, the ABR packetizer 32 may divide each GOP of the UHD video including a plurality of group of pictures (GOPs) into an appropriate number corresponding to a packet size, for example, 3 sub GOPs, and carry each of the divided sub GOP in each packet. The packetization method may be provided in various ways according to the design method.

For example, the ABR packetizer 32 may provide information on packet data, for example, encoding information, to the electronic device 1 by adding the ABR header 101. As an example, the ABR packetizer 32 may provide information on an encoding bit rate, a codec, and the like to the electronic device 1, thereby enabling the electronic device 1 to prepare for processing such as decoding of the packet data.

The encoding information may include not only encoding information for the packet data, but also information on a bit rate that may be encoded by the transcoder 31. For example, when the transcoder 31 may encode the content images for each of the plurality of bit rates, the encoding information may include information on the plurality of bit rates. When the transcoder 31 performs encoding at a bit rate corresponding to the image qualities such as UHD, FHD, and HD, the encoding information may include information on the bit rates each corresponding to the image qualities such as UHD, FHD, and HD.

Similar to the addition of the ABR header in the ABR packetizer 32, various headers may be added to packet data and transmitted. For example, the SRT 36 may add an SRT header to the packet data, may add a UDP header to the UDP 37, an IP header to the IP 38, and the like, and may transmit the packet data to the NIC 49 of the electronic device 1 through the NIC 39.

Hereinafter, operation of the electronic device 1 for the streaming service will be described. The operation of the electronic device 1 described below may be achieved by allowing at least one of the processor 17 and the communication interface 11 to perform operations of all or a part of the components illustrated in FIG. 3.

The electronic device 1 may identify an IP header for the IP 48 and a UDP header for the UDP 47, an SRT header for the SRT 46, and the like in the reverse order of the external device 2, for the packet data received from the external device 2 through the NIC 49, and analyze the identified headers.

The ABR depacketizer 42 may identify the ABR header 101 from the packet data and analyze the encoding information included in the ABR header 101. For example, the ABR depacketizer 42 may analyze the encoding information included in the ABR header 101 to identify an encoding bit rate, a codec, and the like for the packet data.

The ABR depacketizer 42 may depacketize the packet data, for example, extract data carried in each packet, and combine the extracted data. For example, in case of depacketizing the packet of the UHD video, the ABR depacketizer 42 may extract three sub GOPs carried in each packet, and combine each of the extracted sub GOPs into one GOP. In this case, the ABR depacketizer 42 may perform depacketization by referring to the encoding information. However, the depacketization method may be provided in various ways according to the design method.

The ABR depacketizer 42 may identify whether a packet is received. For example, the ABR depacketizer 42 may arrange the depacketized frames in order according to a serial number, and may identify the non-received packets. The ABR depacketizer 42 may transmit a signal indicating whether a packet is received, for example, negative acknowledge (NACK), ACK, keep alive, and the like to the external device 2. A signal indicating whether a packet is received may be transmitted at preset time intervals or may be periodically transmitted. For example, the ABR depacketizer 42 may periodically notify a serial number of packets that are not received through NACK. However, the notification signal indicating whether the packet is received is not limited to being transmitted through the ABR depacketizer 42, and therefore, may be transmitted through the SRT 46 according to the design method.

The ABR controller 43 may request the external device 2 for a bit rate of an image to be received. For example, the ABR controller 43 may request the external device 2 to change the encoding bit rate in response to the non-reception of the packet, or request the external device 2 to retransmit the packet encoded at the changed bit rate. In this case, the external device 2 may retransmit the packet encoded at the requested bit rate to the electronic device 1. The ABR controller 43 may transmit information requesting a bit rate to the external device 2 by including the information in a signal indicating whether the packet is received. For example, when NACK is periodically transmitted, the ABR controller 43 may request the external device 2 for the bit rate by including information requesting a bit rate in NACK. Therefore, there may be no need to prepare a separate signal for requesting a bit rate or provide a separate configuration.

In addition, the ABR controller 43 may obtain information on the current situations of the network and the like, such as a round trip time (RTT), a packet loss rate (PLR), and a bandwidth based on the SRT header identified by the SRT 46. The ABR controller 43 may transmit information on the situations of the network and the like to the external device 2 to cause the external device 2 to refer to the information in determining the encoding bit rate.

The ABR controller 43 may directly select a bit rate. For example, the ABR controller 43 may request for the external device 2 for the bit rate, but may directly determine the bit rate according to the situations of the network and the like. Since the ABR controller 43 may identify a plurality of bit rates that may be encoded by the transcoder 31 based on the encoding information, any one of the plurality of bit rates may be directly selected based on the information on the situations of the network and the like. The ABR controller 43 may transmit information on the selected bit rate to the external device 2 by including the information in a signal indicating whether the packet is received.

The decoder 41 may decode a frame depacketized by the ABR depacketizer 42, and thus may display the depacketized frame as, for example, the image 18 of the UHD image quality.

Figure 4:
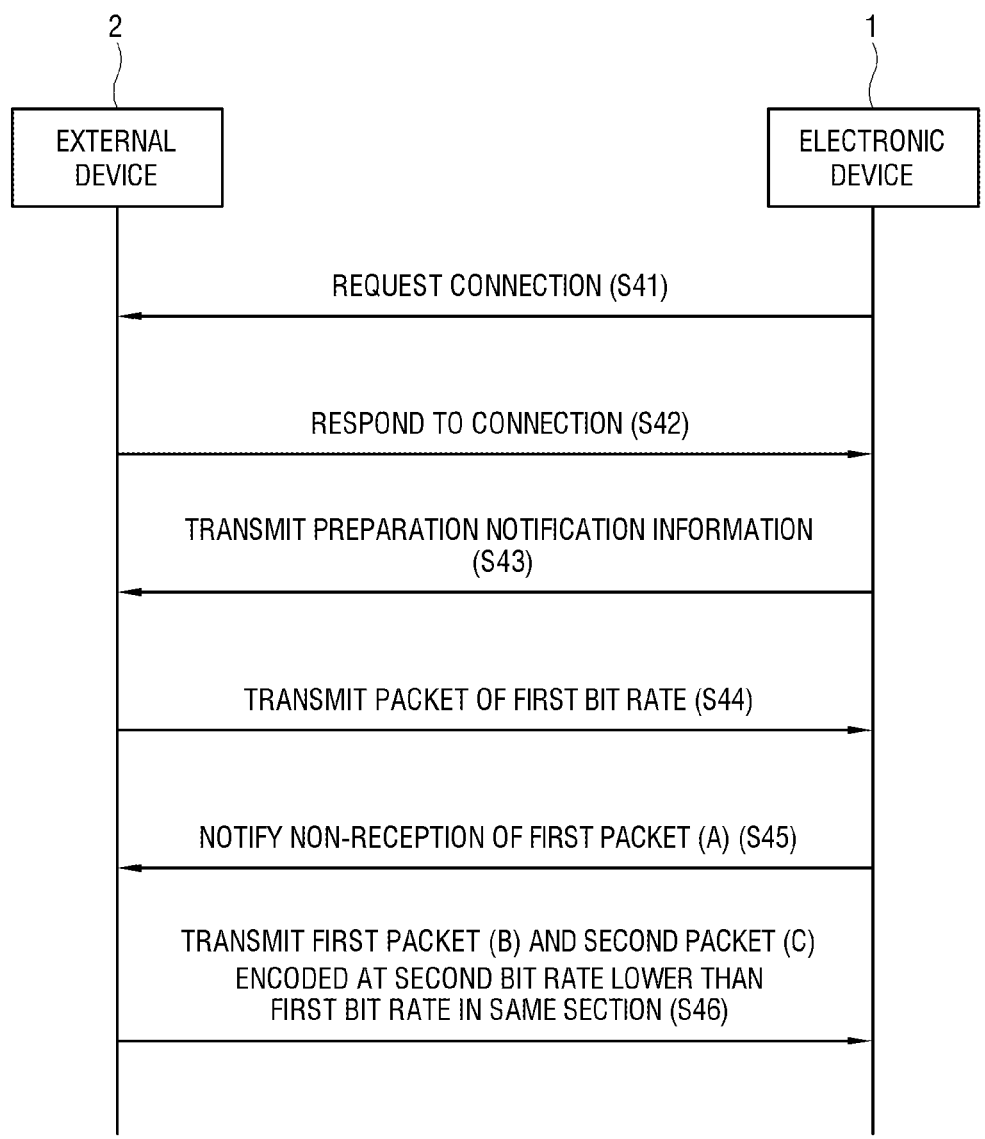
FIG. 4 is a signal flow diagram illustrating an example operation between the electronic device and the external device according to an embodiment.

FIG. 4 is a signal flow diagram illustrating an example operation between the electronic device and the external device according an embodiment of the disclosure. The operation according to an embodiment may be performed by the processor 17 of the electronic device 1 and the second processor 23 of the external device 2 each executing the control programs described above. Hereinafter, for convenience of description, it may be briefly described as an operation of the processor 17 and the second processor 23.

As illustrated in FIG. 4, the processor 17 of the electronic device 1 may request a connection to the external device 2 for the streaming service (S41). Through the connection request, the processor 17 may transmit, for example, a connection address of the electronic device 1, information on content desired to be provided through a streaming service, and the like.

In addition, the second processor 23 of the external device 2 may transmit a connection response corresponding to the connection request to the electronic device 1 (S42). The second processor 23 may prepare for processing of a packet to be transmitted later by transmitting, for example, encoding information and the like on the content through the connection response.

In response to the connection response, the processor 17 may transmit, to the external device 2, preparation notification information indicating whether to receive the packet of the content image (S43). The preparation notification information may be transmitted based on a signal indicating whether the packet is received, such as NACK, ACK, or Keep Alive.

The second processor 23 may transmit a packet encoded at the first bit rate in response to the preparation notification from the electronic device 1 (S44). For example, the second processor 23 may select the first bit rate capable of maximizing and/or increasing the available bandwidth as long as the situations of the network and the like are allowed. For example, the second processor 23 may select, for example, the first bit rate using up to an overhead bandwidth (see 72 in FIG. 7) among the maximum bandwidth (see 71 in FIG. 7) for data communication, and may transmit the encoded packet based on the selected first bit.

The second processor 23 may select the first bit rate based on information on the situations of the network and the like, for example, the streaming rate. The information on the situations of the network and the like may be collected by the external device 2, but is not limited thereto, and may be received from the electronic device 1 as described above. As another example, the second processor 23 may transmit information on a plurality of available bit rates to the electronic device 1. In this case, one first bit rate may be selected from among a plurality of bit rates available by the first processor 17 of the electronic device 1 based on the situations of the network and the like, and information on the selected first bit rate may be transmitted to the external device 2. The second processor 23 of the external device 2 may transmit the packet encoded at the first bit rate based on the information received from the electronic device 1.

The processor 17 may identify whether the packet encoded at the first bit rate is received, and periodically notify the external device 2 of the reception of the encoded packet through the NACK. For example, the processor 17 may arrange a plurality of frames according to the serial number of the packets assigned to the received packets, and may periodically notify the external device 2 of a serial number of packets corresponding to non-received frames among the plurality of arranged frames through the NACK.

The processor 17 may notify the external device 2 whether the first packet (a in FIG. 7) is not received (S45). If the first packet (see a in FIG. 7) is not received in the first section (see 75 in FIG. 7), the processor 17 may notify the external device 2 of information on a serial number of the first packet (a) through, for example, the NACK.

In addition, the second processor 23 may transmit, to the electronic device 1, the first packet (see b in FIG. 7) and the second packet (see c in FIG. 7) encoded at the second bit rate in a second section (see 76 in FIG. 7) after a first section 75 in response to the notification of the non-reception of the first packet (a) from the electronic device 1 (S46). Here, the second bit rate may be lower than the first bit rate. For example, when the situations of the network and the like are not allowed, the second processor 23 may actively and adaptively adjust the bit rate according to the situations, such as lowering the first bit rate to the second bit rate which is an appropriate level for the situations. The processor 17 may receive the first packet (b) and the second packet (c) encoded at the actively and adaptively adjusted second bit rate from the external device 2, and decode the received first packet (b) and second packet (c) at the second bit rate to provide the streaming service without delay despite the non-reception of the first packet (a) in the first section 75.

In this way, according to an embodiment the electronic device 1 and the external device 2, the bit rate may be actively and adaptively adjusted according to the situations not only to provide the high-definition image 18 at the bit rate maximally using the available bandwidth when the situations of the network and the like are good, but also to temporarily reduce the bit rate even when the situations of the network and the like are bad to retransmit the high-definition image 18, thereby effectively providing the image 18 seamlessly.

Figure 5:
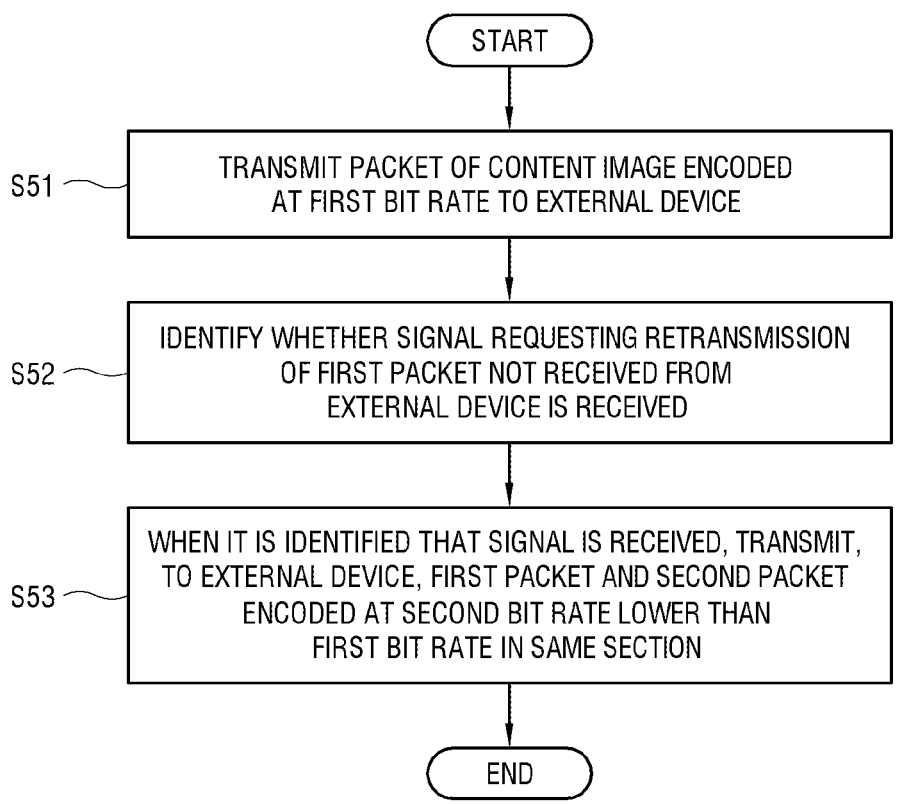
FIG. 5 is a flowchart illustrating an example method of controlling an external device according to an embodiment.

FIG. 5 is a flowchart illustrating an example method of controlling an external device according to an embodiment. The operation according to an embodiment may be performed by the second processor 23 of the external device 2 executing the control program described above. Hereinafter, for convenience of explanation, the operation performed by the second processor 23 executing the control program may be briefly described as the operation of the second processor 23.

As illustrated in FIG. 5, the second processor 23 may stream and transmit the packet of the content image encoded at the first bit rate to the electronic device 1 (S51). As described above, the first bit rate may be utilized up to the overhead bandwidth 72, and as another example, may be determined based on the information on the situations of the network and the like.

In addition, the second processor 23 may identify whether a signal requesting the retransmission of the first packet (a), which is not received from the electronic device 1, is received (S52).

In addition, when it is identified that the corresponding signal is received, the second processor 23 may transmit, to the electronic device 1, the first packet (b) and the second packet (c) encoded at the second bit rate lower than the first bit rate in the same section (S53).

Therefore, according to an embodiment, the second processor 23 may cause the electronic device to display the streaming image 18 without delay by actively coping with the case where the electronic device 1 fails to receive the first packet (a) due to, for example, the communication disconnection, the sharp decrease in bandwidth, or the like.

Figure 6:
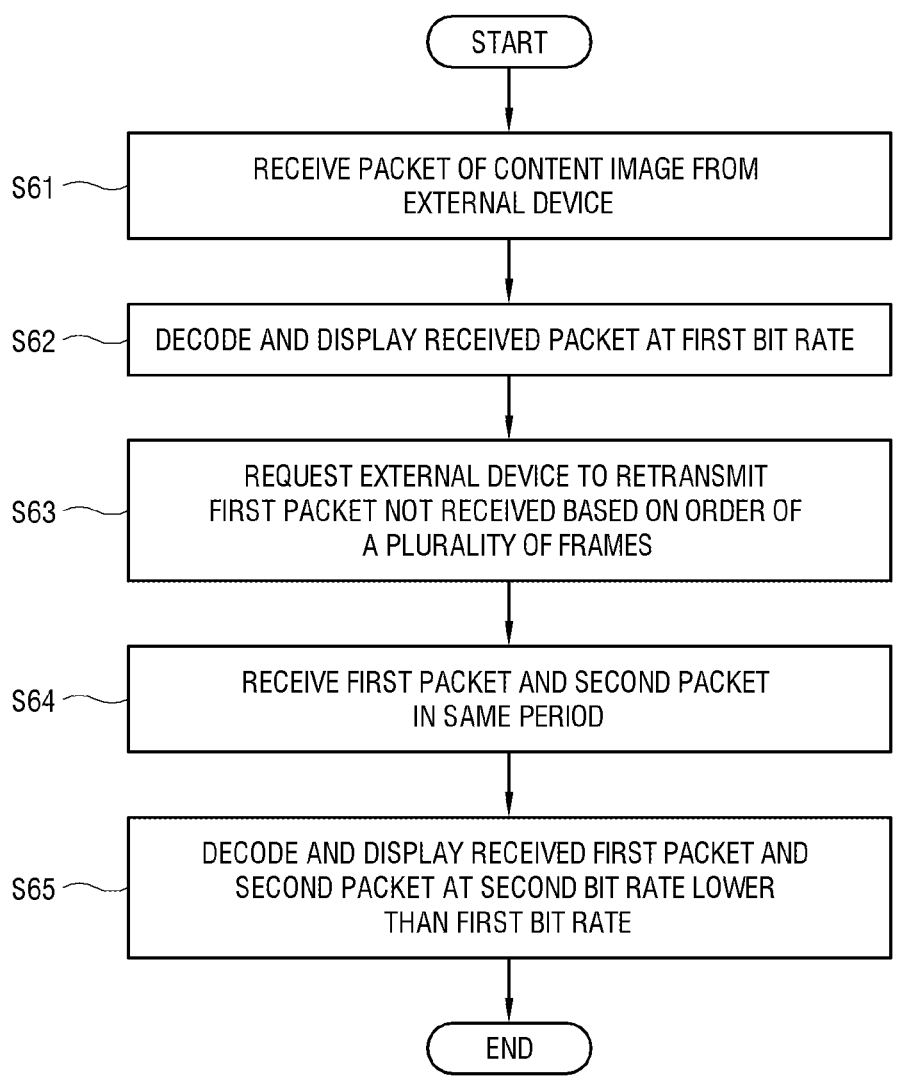
FIG. 6 is a flowchart illustrating an example method of controlling an electronic device according to an embodiment.

FIG. 6 is a flowchart illustrating an example method of controlling an electronic device according to an embodiment. Each operation of FIG. 6 may be executed by the processor 17 of the electronic device 1.

As illustrated in FIG. 6, for the streaming service, the processor 17 of the electronic device 1 may receive the packet of the content image from the external device 2 (S61).

The processor 17 may decode and display the received packet at the first bit rate (S62).

The processor 17 may request the external device 2 to retransmit the first packet (a) which is not received, based on the order of the plurality of frames (S63). For example, the processor 17 may identify whether the first packet (a) is not received based on the serial number of the packets.

The processor 17 may receive the first packet (b) in the same period as the second packet (c) (S64).

The processor 17 may decode and display the received first packet (b) and second packet (c) at the second bit rate lower than the first bit rate (S65).

Therefore, according to an embodiment, the processor 17 may provide the high-quality image 18, and provide the streaming image 18 without delay by actively coping with the non-reception of the first packet (a) due to the communication disconnection, the sharp decrease in bandwidth, and the like, thereby improving the realism and liveliness through the streaming service, and improving the viewing environment for the streaming service.

Figure 7:
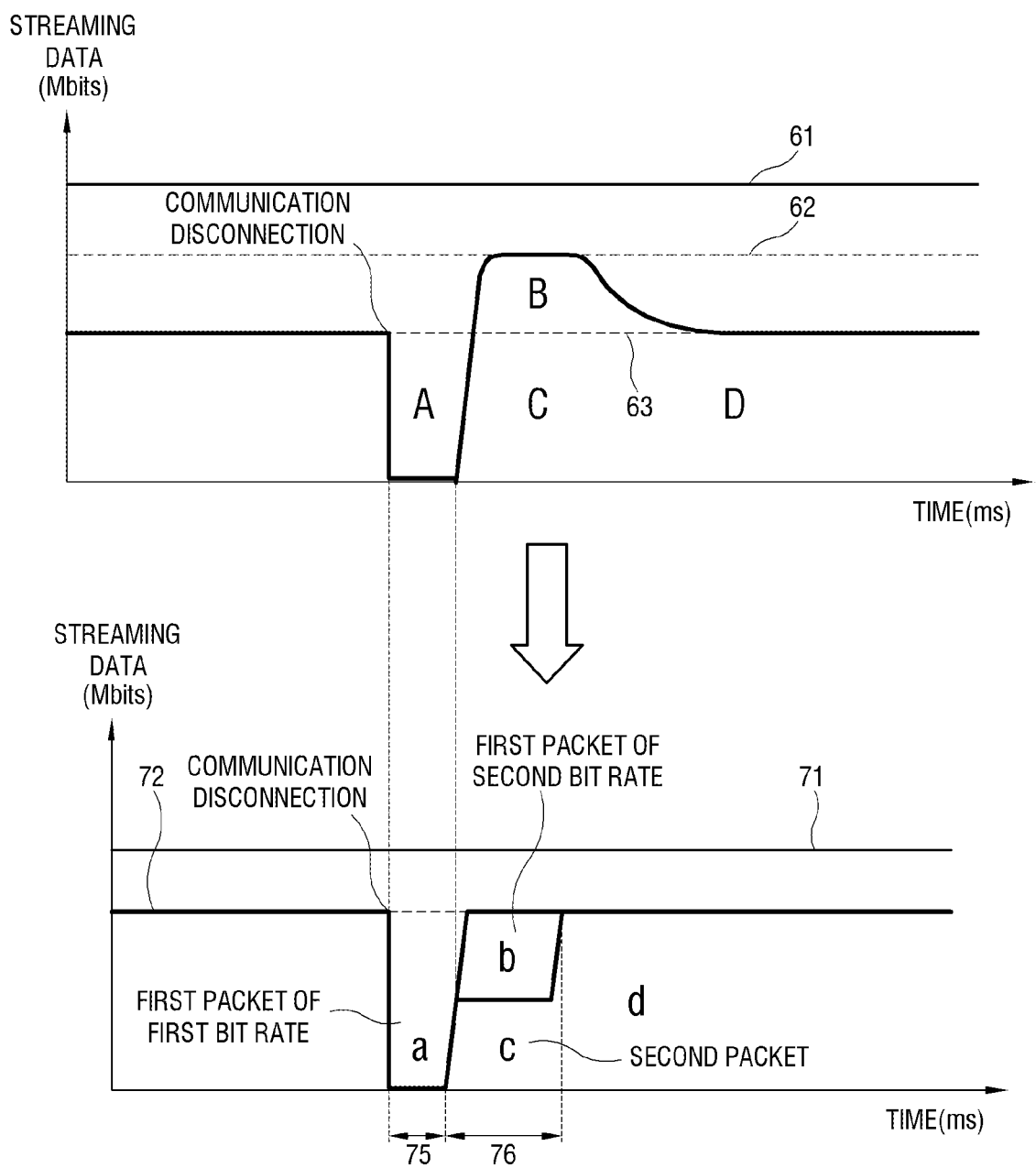
FIG. 7 is a graph illustrating an example of retransmitting and re-receiving a first packet based on a non-reception of the first packet according to an embodiment.

FIG. 7 is a graph illustrating an example of retransmitting and re-receiving the first packet based on the non-reception of the first packet, as described with reference to FIGS. 4, 5 and 6. As illustrated in FIG. 7, the second processor 23 of the external device 2 may stream and transmit the packet encoded at the first bit rate using up to the overhead bandwidth 72, and the processor 17 may display the streaming image 18 by decoding the packet, which is encoded at the first bit rate, at the first bit rate.

When the processor 17 fails to receive the first packet (a) in the first section 75 due to the communication disconnection and the like during the streaming transmission, the second processor 23 may retransmit the first packet (b) encoded at the second bit rate temporarily lowered compared to the first bit rate in the second section 76 after the first section 75, and the processor 17 may decode the first packet (b) received in the second section 76 and encoded at the second bit rate, thereby seamlessly displaying the streaming image 18.

In addition, the second processor 23 of the external device 2 may encode a third packet (d) by restoring the bit rate to the first bit rate maximally using the available bandwidth 71 again in the third section in which the retransmission is completed after the second section 76, and the processor 17 may display the streaming image 18 based on the third packet (d) received in the third section and encoded at the first bit rate.

Therefore, according to an embodiment, by providing the high-quality streaming image 18 without delay by actively and adaptively adjusting the bit rate for each section according to the situations, it is possible to maintain the quality of the image 18 regardless of the situations.

On the other hand, as illustrated in FIG. 7, a reference example in the case of encoding a packet at a bit rate of a low bandwidth 63 reserved for the overhead bandwidth 62 in order to secure the overhead bandwidth 62 is assumed. The present embodiment performs encoding at a first bit rate of a higher bandwidth 72 than the bandwidth 63 of the reference example, thereby providing the high-definition streaming image 18.

In addition, in the reference example, in response to the non-reception of the first packet (a) in the first section 75 due to the communication disconnection, the first packet (b) that is not received and is retransmitted, and the second packet (c) that is currently streamed are transmitted in the second packet 76 without changing the bit rate. In this way, if the description of the reference example for maintaining the bit rate in the retransmission section is applied to the present embodiment as it is, a bandwidth excess phenomenon may occur in the retransmission section. However, according to the present embodiment, by transmitting the first packet (b) and the second packet (c) encoded at the second bit rate temporarily lowered compared to the first bit rate according to the situations in the second section 76, unlike the description of the reference example, the bandwidth excess phenomenon may be prevented and/or avoided.

FIG. 8 is a graph illustrating an example of changing a bit rate according to an embodiment. As illustrated in FIG. 8, the second processor 23 of the external device 2 may stream the packet encoded at the first bit rate using up to an overhead bandwidth 82. During the streaming transmission, when a maximum bandwidth 81 decreases due to the deterioration in the situations of the network and the like, for example, when the maximum bandwidth 81 falls below the bandwidth 82 corresponding to the current first bit rate, the second processor 23 may transmit the packet encoded at the second bit rate lower than the first bit rate. The second bit rate of the present embodiment may be adjusted to an appropriate level to fit the reduced maximum bandwidth 81.

As in the case of the first bit rate described above, in the second bit rate, the information on the second bit rate may be collected, and the second processor 23 may change the bit rate to the second bit rate based on the collected information.

When the overhead bandwidth 82 is restored by the recovery of the maximum bandwidth 81, the second processor 23 may transmit the encoded packet again based on the first bit rate.

On the other hand, as illustrated in FIG. 8, a reference example in the case of encoding a packet at a bit rate of a low bandwidth 63 reserved for the overhead bandwidth 62 in order to secure the overhead bandwidth 62 is assumed. In contrast to this case, the present embodiment performs encoding at a first bit rate of a higher bandwidth 72 than the bandwidth 63 of the reference example, thereby providing the high-definition streaming image 18.

In addition, in the reference example, when the maximum bandwidth 61 is reduced during the streaming transmission due to the deterioration in the situations of the network and the like, for example, when the maximum bandwidth 61 is lowered below the bandwidth 63, it may not be possible to receive the first packet (a) due to the frame drop. However, according to the present embodiment, since the first bit rate is adjusted to the second bit rate of an appropriate level for the reduced maximum bandwidth 81, unlike the description of the reference example, the non-reception of the first packet (a) due to the frame drop may be prevented.

Figure 9:
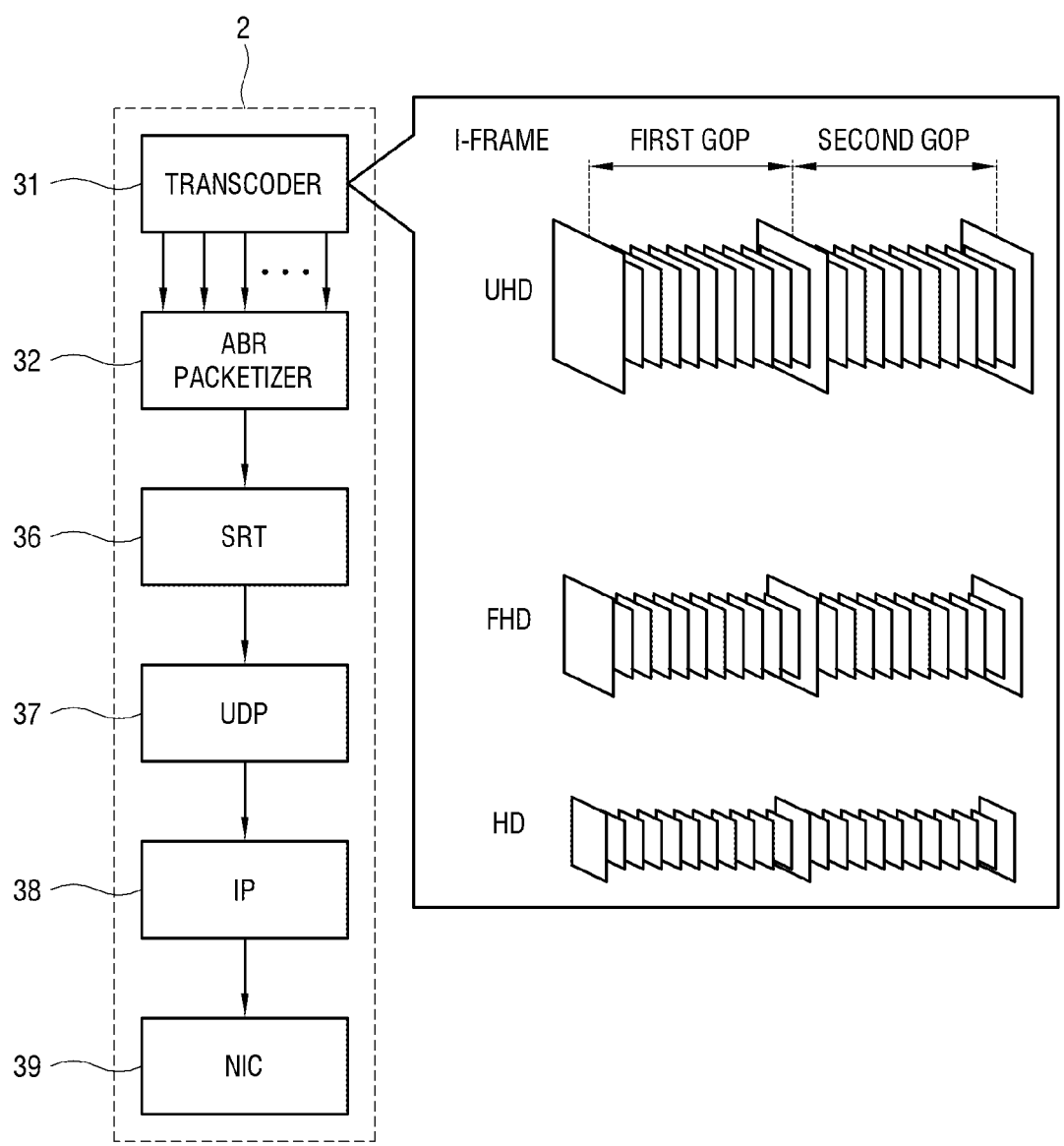
FIG. 9 is a diagram illustrating an example in which a transcoder of FIG. 3 encodes frames for each of a plurality of bit rates according to an embodiment.

FIG. 9 is a diagram illustrating an example in which the transcoder of FIG. 3 encodes images for each of the plurality of bit rates according to an embodiment. As illustrated in FIG. 9, the transcoder 31 may encode the content image at a plurality of bit rates. In particular, by performing encoding at different bit rates, it is possible to prepare encoded packets for each of various image qualities, for example, the UHD, the FHD, and the HD.

The packets encoded at each bit rate may be implemented as a plurality of frame groups each including a plurality of subframes. For example, referring to FIG. 9, the UHD frame may include a first frame group and a second frame group. The frame group may be implemented in units of GOP. However, since the number of frame groups and the number of subframes are not limited to those illustrated in FIG. 9, the number of frame groups and the number of subframes may vary according to the design method. Meanwhile, since the size of each frame group, that is, the size of each GOP, may correspond to each image quality, for example, the size of each GOP may decrease in the order of the UHD, the FHD, and the HD.

Figure 10:
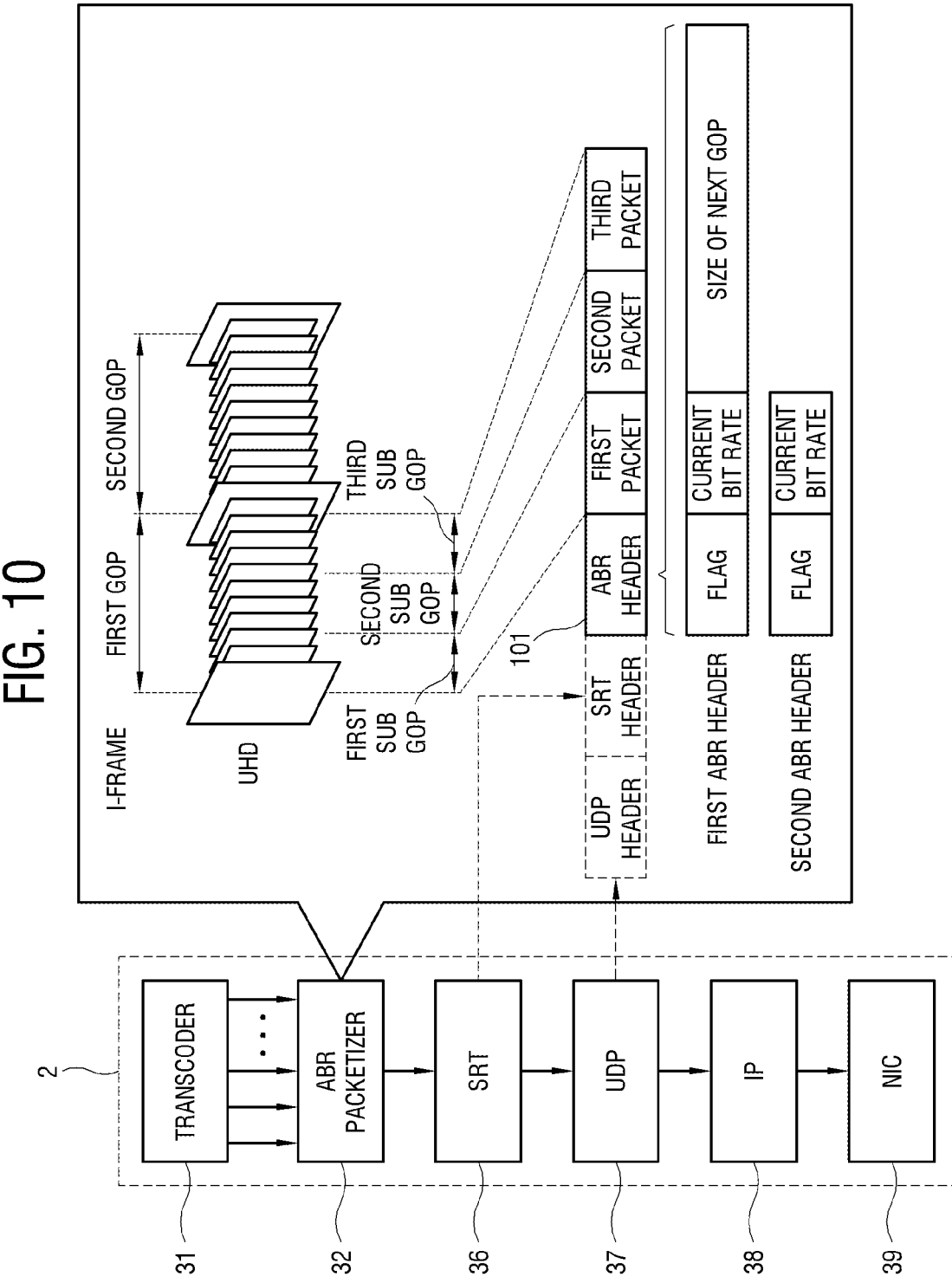
FIG. 10 is a diagram illustrating an example in which an ABR packetizer of FIG. 3 packetizes encoded data according to an embodiment.

FIG. 10 is a diagram illustrating an example in which an ABR packetizer of FIG. 3 packetizes encoded data according to an embodiment. As illustrated in FIG. 10, the ABR packetizer 32 may divide each frame group into a predetermined number of subframes, and carry each divided subframe in a packet. For example, when the UHD frame is packetized, each GOP may be divided into three sub GOPs, and each divided sub GOP may be carried in each packet.

For example, the ABR packetizer 32 adds an ABR header 101 to provide information on packet data, such as frame information and encoding information, to the electronic device 1, so the electronic device 1 may prepare for processing such as decoding of the packet data. For example, the ABR header 101 may include information about a flag, a current bit rate, and a size of a next GOP. The flag may include, for example, information on whether information is included in the ABR header 101, the current bit rate may include, for example, information on the first bit rate corresponding to the UHD, and the size of the next GOP may include, for example, information on the size of the second GOP in the case of the ABR header for the first GOP. However, since the information configuration of the ABR header 101 is not limited to the above, the electronic device 1 may provide various information that may be referenced for packet data processing according to the design method. In addition, the first ABR header may include all the above information, the information on the flag, the current bit rate, the size of the next GOP, and the like, but the subsequent ABR header may include necessary information, for example, the information on the flag and the current bit rate.

Figure 11:
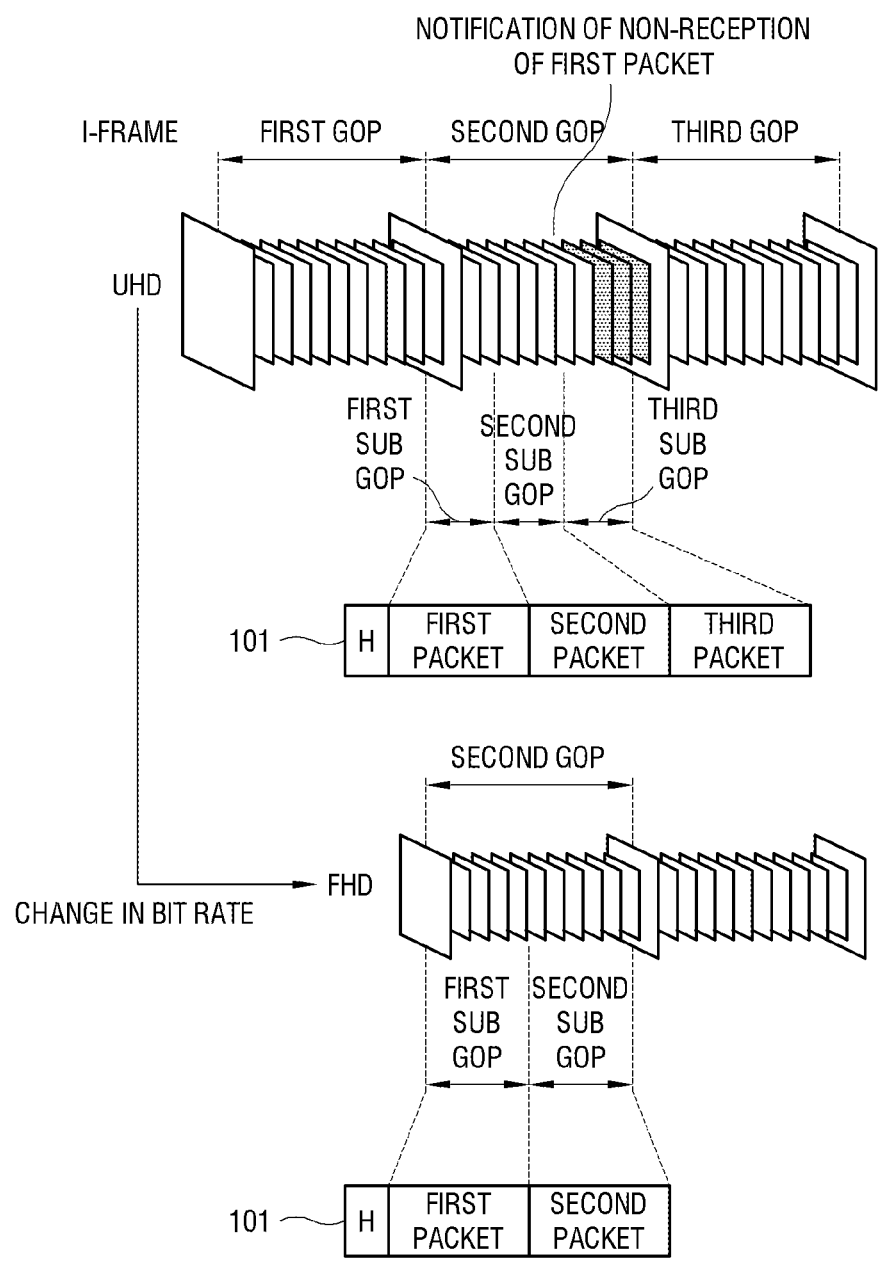
FIG. 11 is a diagram illustrating an example of changing a bit rate in relation to operation S63 of FIG. 6 according to an embodiment.

FIG. 11 is a diagram illustrating an example of changing a bit rate in relation to operation S63 of FIG. 6 according to an embodiment. Referring to FIG. 11, the second processor 23 of the external device 2 may packetize the frame encoded at the first bit rate, that is, divide each of the plurality of frame groups into a predetermined number of subframes, and perform packetization to load the packet in each divided subframe. For example, the second processor 23 may divide each of the plurality of GOPs encoded at the first bit rate for the UHD frame into the plurality of sub GOPs, for example, three sub GOPs, and may load each divided sub GOP in each packet.

When the second processor 23 receives the notification that the first packet (a) is not received from the electronic device 1 while transmitting the packets of the plurality of frame groups to the electronic device 1 or receives a request to change the bit rate, the second processor 23 may perform encoding at the second bit rate in units of the frame group, and may perform packetization in the frame group into the plurality of subframes to fit the second bit rate. Describing the case where the first bit rate corresponding to the UHD is changed to the second bit rate corresponding to the FHD as an example, when the first sub GOP and the second sub GOP of the plurality of sub GOPs of the second GOP of the UHD frame are completed, that is, when the third sub GOP is transmitted, if the non-reception notification or the bit rate change request are received from the electronic device 1, the second processor 23 may encode the entire second GOP of the UHD frame at the second bit rate corresponding to the FHD data and perform the packetization to be fitted to the second bit rate. Since the second bit rate is lower than the first bit rate, the GOP may be divided into the smaller number of sub GOPs, for example, a first sub GOP and a second sub GOP, and carried in each packet compared to the case of performing the encoding at the first bit rate.

The reason for encoding and packetizing the entire second GOP of the UHD frame at the second bit rate is that the entire second GOP is based on one I-frame, and therefore when the encoding bit rate for the first sub GOP including the I-frame and the encoding bit rate for the third sub GOP at the time the notification or request is received are different, the image 18 may not be displayed or may be interrupted and displayed.

The second processor 23 may add, for example, the identification information of the second GOP, that is, information on whether the second GOP is the UHD or the FHD, the information on the current bit rate, and the like to the packet through, for example, the ABR header 101, and as a result, the processor 17 of the electronic device 1 may identify, for example, the first sub GOP and the second sub GOP of the second UHD GOP received in advance from the external device 2, and the second GOP of the FHD re-received after the transmission of the notification. That is, the processor 17 may decode the second GOP of the FHD encoded at the second bit rate through the ABR header 101, thereby preventing the first and second sub GOPs of the second GOP of the UHD frame from being redundantly decoded.

Figure 12:
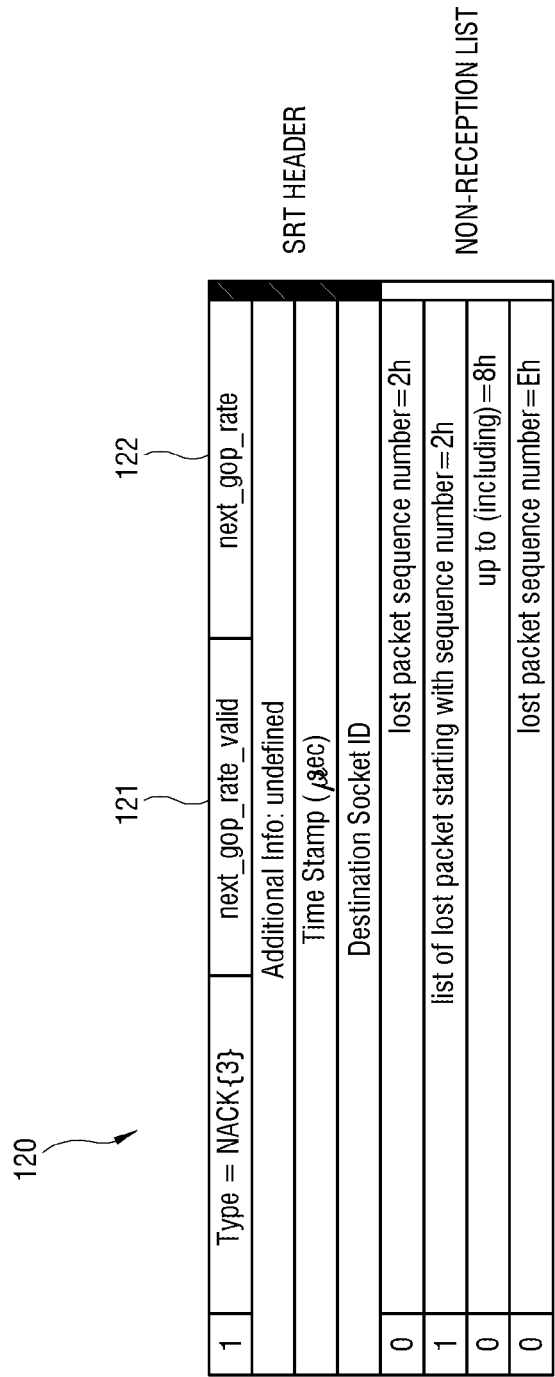
FIG. 12 is a diagram illustrating an example configuration of an SRT header of FIG. 10 according to an embodiment.

FIG. 12 is a diagram illustrating an example configuration of an SRT header of FIG. 10 according to an embodiment. As described above with reference to FIG. 10, the second processor 23 of the external device 2 may transmit the information on the packet data, for example, the encoding information, to the electronic device 1 through a separate ABR header 101, but may also transmit the encoding information to the electronic device 1 through the SRT header 120 of the SRT 36.

For example, as illustrated in FIG. 12, a first region 121 and a second region 122 which are an empty region in the SRT header 120 may include a flag, that is, information on whether the bit rate of the next GOP is included and information on the next GOP bit rate, respectively. However, since the type of information that may be included in the first region 121 and the second region 122 is not limited, various encoding information may be included according to the design method.

As described above, when the SRT header 120 is used instead of the addition of the separate ABR header 101, the streaming data processing rate may be improved, and as a result, the viewing environment for the streaming service may be improved.

Figure 13:
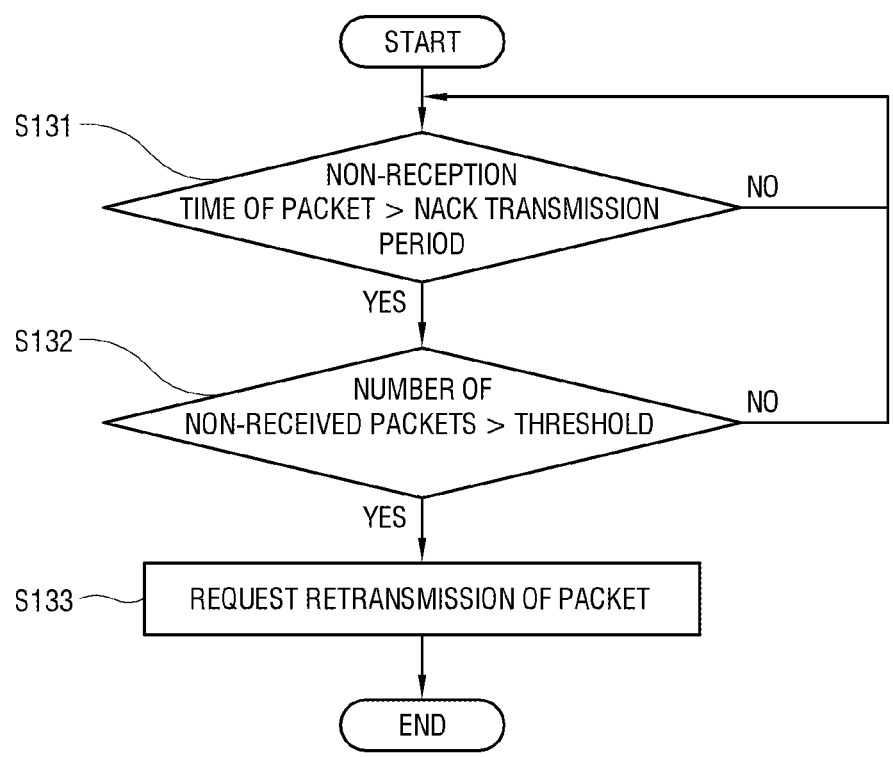
FIG. 13 is a flowchart illustrating an example method for requesting retransmission of a packet in relation to operation S64 of FIG. 6 according to an embodiment.

FIG. 13 is a flowchart illustrating an example method for requesting retransmission of a packet in relation to operation S64 of FIG. 6 according to an embodiment. As described in connection with operation S63 of FIG. 6, for example, whenever the non-reception of the first packet (a) in the first section 75 is identified, if the retransmission of the first packet (a) is requested, the processing burden on the processor 17 and the second processor 23 of the external device 2 may increase, and as a result, the viewing environment for the streaming service may decrease.

Accordingly, the processor 17 according to an embodiment may identify whether the packet is not received for a predetermined time or longer. For example, the processor 17 may identify whether the non-reception time of the first packet (a) of the first section 75 lasts longer than the transmission period of the NACK (S131).

The processor 17 may identify whether the number of non-received packets is equal to or greater than a predetermined threshold (S132). However, since a contrast time or a contrast value for the non-reception time or the number of the first packets (a) in the first section 75 is not limited to the transmission period of the NACK or the predetermined threshold, various contrast times or contrast values according to the design method may be included.

For example, when the non-reception of the packet lasts longer than the NACK transmission period and the number of non-received packets is greater than or equal to a predetermined threshold, the processor 17 may request the external device 2 to retransmit the packet (S133).

As described above, according to the present embodiment, since the processing burden on the processor 17 and the second processor 23 of the external device 2 is reduced, it is possible to improve the viewing environment for the streaming service.

Figure 14:
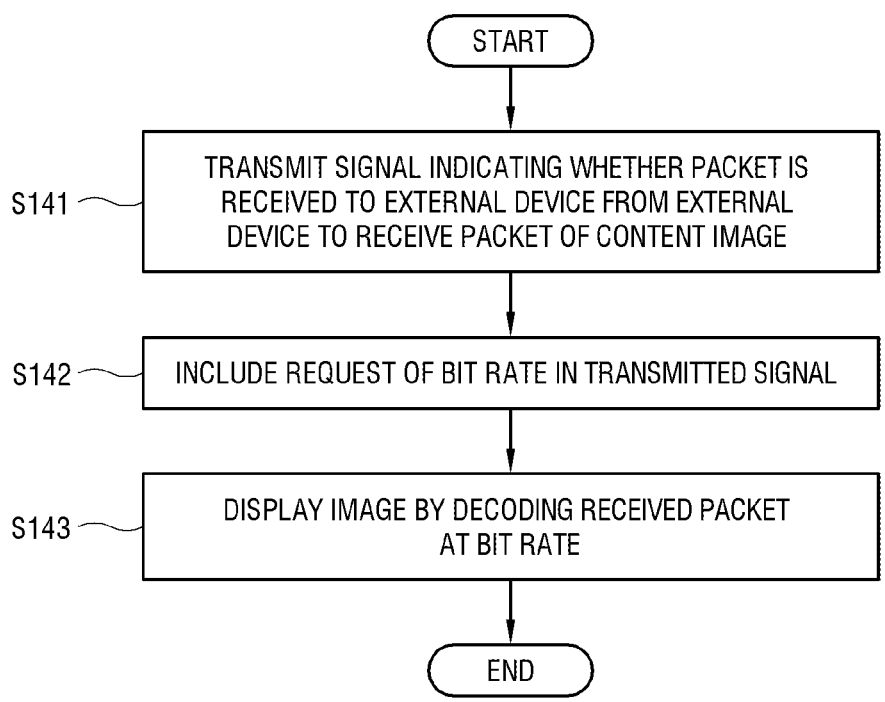
FIG. 14 is a flowchart illustrating an example method of controlling an electronic device of FIG. 4 according to an embodiment.

FIG. 14 is a flowchart illustrating an example method of controlling an electronic device according to FIG. 4 according to an embodiment. Each operation of FIG. 14 may be executed by the processor 17 of the electronic device 1.

The processor 17 of the electronic device 1 may transmit a signal indicating whether the packet is received to the external device 2 in order to receive the packet of the content image from the external device 2 (S141). In some cases, the processor 17 of the electronic device 1 may transmit the signal indicating whether the packet is received to the external device 2 after requesting the connection to the external device 2 for the streaming service.

The processor 17 of the electronic device 1 may include a request for a bit rate in the transmitted signal (S142). The bit rate requested may only be a request for a change in bit rate. In this case, the second processor 23 may transmit a packet encoded at a bit rate suitable for the situations of the network and the like in response to the bit rate request from the electronic device 1. However, the requested bit rate may include a bit rate directly selected by the processor 17. As an example, the processor 17 may identify a plurality of bit rates that may be encoded in the external device 2 based on the encoding information transmitted from the external device 2, select the bit rate based on the situations of the network and the like with the external device 2, for example, the streaming rate and the like, and transmit a request for the selected bit rate to the external device 2. In this case, the second processor 23 may transmit the packet encoded at the bit rate directly selected by the electronic device 1.

Further, the processor 17 may decode the received packet at the requested bit rate and display the image 18 (S143).

Figure 15:
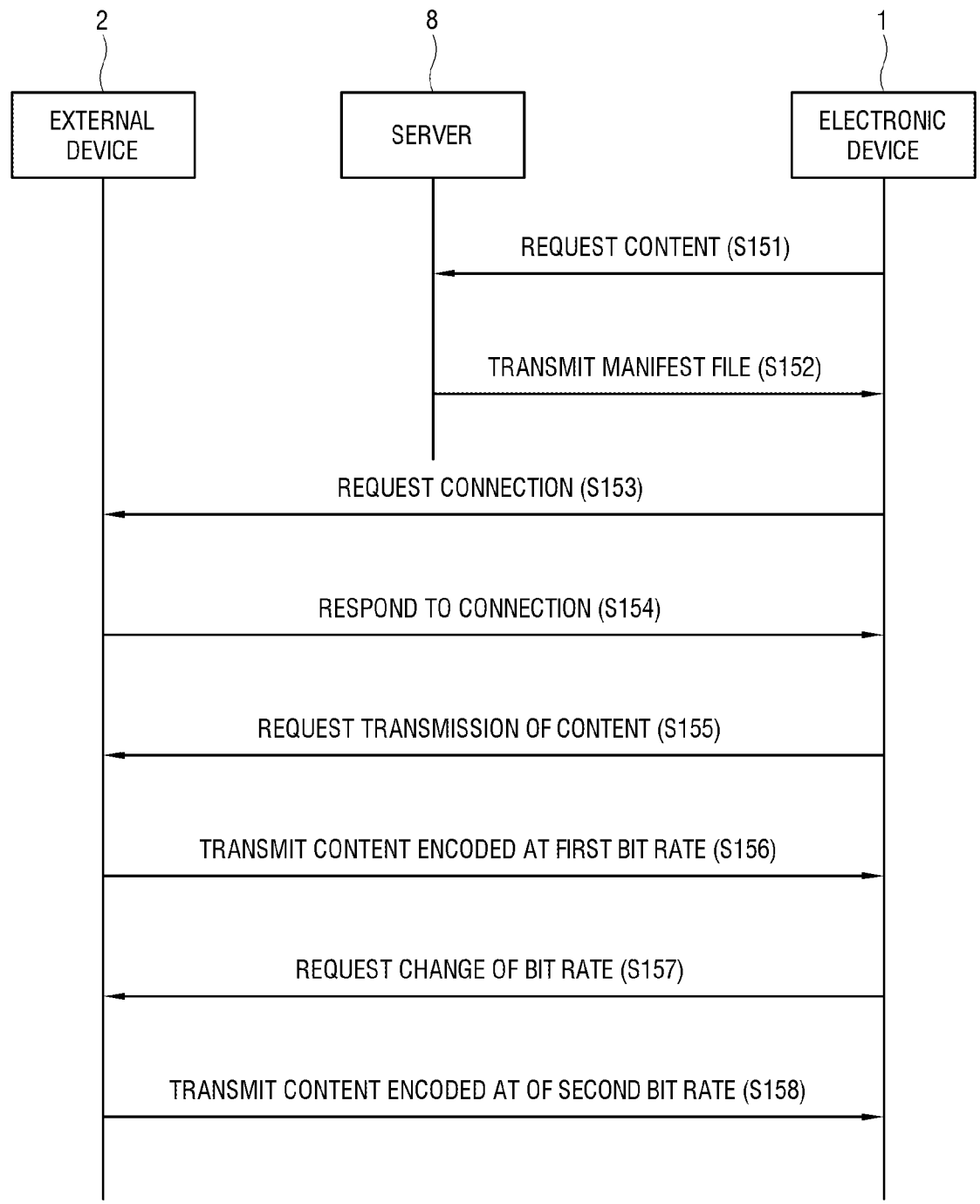
FIG. 15 is a signal flow diagram illustrating an example operation between the electronic device, the external device, and a server according to an embodiment.

FIG. 15 is a signal flow diagram illustrating an example operation between the electronic device, the external device, and a server according to an embodiment. As illustrated in FIG. 15, the processor 17 of the electronic device 1 may request the server 8 for the predetermined content (S151). The server 8 may include, for example, a server of an Internet portal site, and may include a master server or a main server for at least one of the electronic device 1 and the external device 2.

In addition, the server 8 may transmit a manifest file to the electronic device 1 in response to the content request (S152). The manifest file may include information on at least one external device 2 capable of providing content, and information on an image quality, a bit rate, and a bandwidth of the content provided by the at least one external device 2.

The processor 17 may request the connection to at least one external device 2 based on the manifest file (S153).

The second processor 23 of the external device 2 may transmit a connection response in response to the connection request (S154).

The processor 17 may request the transmission of the content image in response to the connection response (S155). For example, the processor 17 may notify that it is ready to receive the packet of the content image through the NACK.

The second processor 23 may transmit, to the electronic device 1, the content encoded at the first bit rate in response to the transmission request for the packet of the content image (S156).

The processor 17 may request the external device 2 for the bit rate change in response to, for example, the communication disconnection, the bandwidth fluctuation, or the like (S157).

The second processor 23 may transmit, for example, the content encoded at the second bit rate lower than the first bit rate (S158).

According to an embodiment, the processor 17 requests the connection to the external device 2 (S153), but as another example, the second processor 23 may request the connection to the electronic device 1.

For example, in response to the content request by the processor 17 (S151), the server 8 may transmit the manifest file to the electronic device 1 (S152), and in this case, the address of the electronic device 1 may be transmitted to the external device 2. The second processor 23 may request the connection to the electronic device 1 based on the address and the like of the electronic device 1 received from the server 8, and the processor 17 may transmit the response to the connection in response to the connection request to the external device 2. The following operations are redundant with those described above, and therefore will be omitted for convenience of description.

Various embodiments disclosed in the disclosure may be implemented as software including one or more instructions stored in a storage medium that may be read by a machine such as the electronic device 1. For example, the processor 17 of the electronic device 1 may call and execute at least one instruction among one or more instructions stored from the storage medium. This makes it possible for a device such as an electronic device 1 to be operated to perform at least one function according to the at least one command called. The one or more instructions may include codes generated by a compiler or codes executable by an interpreter. The machine-readable storage medium may be provided in a form of a non-transitory storage medium. Here, the 'non-transitory' storage medium is a tangible device, and may not include a signal (for example, electromagnetic waves), and the term does not distinguish between the case where data is stored semi-permanently on a storage medium and the case where data is temporarily stored thereon.

According to an embodiment, the methods according to the diverse embodiments disclosed in the disclosure may be included and provided in a computer program product. The computer program product may be traded as a product between a seller and a purchaser. The computer program product may be distributed in the form of a machine-readable storage medium (for example, CD-ROM), or may be distributed (for example, download or upload) through an application store (for example, Play Store™) or may be directly distributed (for example, download or upload) between two user devices (for example, smartphones) online. In case of the online distribution, at least a portion of the computer program product may be at least temporarily stored in a storage medium such as a memory of a server of a manufacturer, a server of an application store, or a relay server or be temporarily generated.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device, comprising:
 a communication interface comprising communication circuitry;
 a display; and
 a processor configured to:
  based on a first packet encoded at a first bit rate among a plurality of packets of a content image being not received from an external device, control the communication interface to transmit a signal indicating that the first packet is not received to the external device, the transmitted signal including a request for retransmission of the first packet,
  receive the first packet with a second packet among the plurality of packets from the external device in a section corresponding to the second packet, a second bit rate of the received first and second packets being lower than the first bit rate,
  receive a third packet encoded at the first bit rate in a section subsequent to the section corresponding to the second packet, and
  control to sequentially display, on the display, the content image based on the received first packet, the received second packet and the received third packet.

2. The electronic device of claim 1, wherein the processor is configured to:
 receive information on a plurality of bit rates of the content image provided from the external device through the communication interface,
 select the first bit rate from among the plurality of bit rates, and
 control the communication interface to transmit the signal including the request for the retransmission of the first packet encoded at the selected first second bit rate.

3. The electronic device of claim 2, wherein the processor is configured to:
 identify a bandwidth in which the first packet is retransmitted, and
 determine the first bit rate based on the identified bandwidth.

4. The electronic device of claim 1, wherein the content image comprises a plurality of frames, and
 the processor is configured to identify that the first packet is not received based on an order of the plurality of frames.

5. The electronic device of claim 1, wherein the content image comprises a plurality of frame groups each including a plurality of subframes, and
 the processor is configured to:
  identify a first frame group and a second frame group corresponding to a same content section as the first frame group, and
  decode the plurality of subframes included in the identified second frame group.

6. The electronic device of claim 5, wherein the processor is configured to identify the second frame group based on information indicating the first frame group and the second frame group.

7. The electronic device of claim 6, wherein the information includes information indicating a size of a frame group subsequent to the second frame group.

8. A method of controlling an electronic device, comprising:
 based on a first packet encoded at a first bit rate among a plurality of packets of a content image being not received from an external device, transmitting a signal indicating that the first packet is not received to the external device, the transmitted signal including a request for retransmission of the first packet;
 receiving the first packet with a second packet among the plurality of packets from the external device in a section corresponding to the second packet, a bit rate of the received first and second packets being lower than the first bit rate,
 receiving a third packet encoded at the first bit rate in a section subsequent to the section corresponding to the second packet; and
 sequentially displaying the content image based on the received first packet, the received second packet and the received third packet.

9. The method of claim 8, wherein the transmitting the signal comprises:
 receiving information on a plurality of bit rates of the content image provided from the external device;
 selecting the first bit rate to be requested from among the plurality of bit rates; and
 transmitting the signal including the request for the retransmission of the first packet encoded at the selected second first bit rate.

10. The method of claim 9, wherein the transmitting the signal comprises:
 identifying a bandwidth in which the first packet is retransmitted; and
 determining the first bit rate based on the identified bandwidth.

11. The method of claim 8, wherein the content image comprises a plurality of frames, and
 further comprising:
  identifying whether the first packet is not received based on an order of the plurality of frames.

12. The method of claim 8, wherein the content image comprises a plurality of frame groups each including a plurality of subframes, and
 the displaying the image comprises:
  identifying a first frame group and a second frame group corresponding to a same content section as the first frame group; and
  decoding the plurality of subframes included in the identified second frame group.

13. The method of claim 12, wherein the identifying the second frame group comprises identifying the second frame group based on information indicating the first frame group and the second frame group.

14. A system, comprising:
 a first electronic device configured to transmit a plurality packets of a content image; and
 a second electronic device configured to:
 based on a first packet encoded at a first bit rate among a plurality of packets being not received from the first device, transmit a signal indicating that the first packet is not received to the first device, the transmitted signal including a request for retransmission of the first packet,
 receive the first packet with a second packet among the plurality of packets from the first device in a section corresponding to the second packet, a second bit rate of the received first and second packets being lower than the first bit rate,
 receive a third packet encoded at the first bit rate in a section subsequent to the section corresponding to the second packet, and sequentially display the content image based on the received first packet, the received second packet and the received third packet.

\* \* \* \* \*